United States Patent
Selvanesan et al.

(10) Patent No.: US 12,127,233 B2
(45) Date of Patent: Oct. 22, 2024

(54) REALLOCATION AND RESERVATION OF RESOURCES FOR HIGH PRIORITY COMMUNICATION AND QUALITY OF SERVICE FEEDBACK

(71) Applicant: KONINKLIJKE PHILIPS N.V., Eindhoven (NL)

(72) Inventors: Sarun Selvanesan, Berlin (DE); Thomas Fehrenbach, Berlin (DE); Cornelius Hellge, Berlin (DE); Roya Ebrahim Rezagah, Berlin (DE); Robin Thomas, Berlin (DE); Thomas Wirth, Berlin (DE); Thomas Schierl, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 695 days.

(21) Appl. No.: 17/169,096

(22) Filed: Feb. 5, 2021

(65) Prior Publication Data

US 2021/0160890 A1 May 27, 2021

Related U.S. Application Data

(63) Continuation of application No. PCT/EP2019/069765, filed on Jul. 23, 2019.

(30) Foreign Application Priority Data

Aug. 9, 2018 (EP) .................................. 18188372

(51) Int. Cl.
H04W 4/00 (2018.01)
H04W 24/04 (2009.01)
(Continued)

(52) U.S. Cl.
CPC ......... *H04W 72/542* (2023.01); *H04W 24/04* (2013.01); *H04W 24/08* (2013.01); *H04W 24/10* (2013.01); *H04W 4/40* (2018.02)

(58) Field of Classification Search
CPC ...... H04W 24/04; H04W 24/08; H04W 24/10
See application file for complete search history.

(56) References Cited

U.S. PATENT DOCUMENTS

| 9,923,681 B2 * | 3/2018 | Zakrzewski | H04W 72/542 |
| 2007/0019582 A1 * | 1/2007 | Frey | H04W 72/542 |
| | | | 370/328 |

(Continued)

FOREIGN PATENT DOCUMENTS

| CA | 2957406 C * | 10/2023 | ......... H04L 12/1863 |
| CN | 107155187 A | 9/2017 | |

(Continued)

OTHER PUBLICATIONS

International Searching Authority, Written Opinion of the International Searching Authority PCT/EP2019/069765, Feb. 13, 2020, European Patent Office, pp. 1-18. (Year: 2020).*

(Continued)

*Primary Examiner* — Elisabeth Benoit Magloire

(57) ABSTRACT

In the field of wireless communications, approaches for a reallocation and reservation of resources for high priority communications, for a Quality of Service feedback, and for handling certain events in a wireless communication network are described. Embodiments relate to the implementation of the approaches for entities of a wireless communication network or system performing sidelink communications. In particular, improved approaches for a reallocation and reservation of resources for high priority (Continued)

communications, for a Quality of Service feedback, and for handling certain events in a wireless communication network are presented.

18 Claims, 15 Drawing Sheets

(51) Int. Cl.
  *H04W 24/08* (2009.01)
  *H04W 24/10* (2009.01)
  *H04W 72/542* (2023.01)
  *H04W 4/40* (2018.01)

(56) References Cited

U.S. PATENT DOCUMENTS

| | | | | |
|---|---|---|---|---|
| 2010/0284364 | A1* | 11/2010 | You | H04L 1/1887 370/330 |
| 2017/0041184 | A1* | 2/2017 | Broz | G06F 1/3203 |
| 2017/0359749 | A1* | 12/2017 | Dao | H04L 47/2416 |
| 2018/0049088 | A1* | 2/2018 | Shiga | H04W 4/44 |
| 2018/0146452 | A1* | 5/2018 | Zhang | H04W 24/04 |
| 2018/0262924 | A1* | 9/2018 | Dao | H04W 72/535 |
| 2018/0324729 | A1* | 11/2018 | Hou | H04W 72/23 |

FOREIGN PATENT DOCUMENTS

| | | | |
|---|---|---|---|
| EP | 3220684 | A1 | 9/2017 |
| EP | 3242449 | A1 | 11/2017 |
| EP | 3416429 | A1 | 12/2018 |
| WO | 2016022849 | A1 | 2/2016 |
| WO | 2017063122 | A1 | 4/2017 |
| WO | 2018129017 | A2 | 7/2018 |

OTHER PUBLICATIONS

"5G System; Network Data Analytics Services", 3GPP TS 29.520 V15.0.0, Stage 3 (Release 15), Jan. 2018, Jan. 2018.
"Architecture enhancements to facilitate communications with packet data networks and applications", 3GPP TS 23.682 V15.5.0, (Release 15), Jun. 2018, Jun. 2018.
"NR and NG-RAN Overall Description", 3GPP TS 38.300 V15.1.0, Stage 2 (Release 15), Mar. 2018, Mar. 2018.
"Physical channels and modulation", 3GPP TS 38.211 V15.1.0, (Release 15), Dec. 2017, Dec. 2017.
"Procedures for the 5G System", 3GPP TS 23.502 V15.2.0, Stage 2, (Release 15), Jun. 2018, Jun. 2018.
"Radio Resource Control (RRC) (Part 1 of 2)", 3GPP TS 36.331 V15.0.1, Protocol specification (Release 15), Jan. 2018, Jan. 2018.
"Radio Resource Control (RRC) (Part 2 of 2)", 3GPP TS 36.331 V15.0.1, Protocol specification (Release 15), Jan. 2018, Jan. 2018.
"System Architecture for the 5G System", 3GPP TS 23.501 V15. 1.0, Stage 2, Mar. 2018, Mar. 2018.
Netmanias , "LTE QoS (Part 2)—LTE QoS Parameters (QCI, ARP, GBR, MBR and AMBR)", https://www.netmanias.com/en/post/blog/5933/lte-qos/lte-qos-part-2-lte-qos-parameters-qci-arp-gbr-mbr-and-ambr , Oct. 2013, Last Accessed Jul. 25, 2018, Oct. 2013.
Netmanias , "LTE QoS: SDF and EPS Bearer QoS", https://www.netmanias.com/en/?m=view&id=techdocs&no=10434 , Sep. 2011, Last Accessed Jul. 25, 2018, Sep. 2011.
3rd Generation Partnership Project "Technical Specification Group Services and System Aspects; Procedures for the 5G System; Stage 2 (Release 15)" 3GPP TS 23.502, Mar. 2018 (Mar. 27, 2018). 285 pages.
3rd Generation Partnership Project "Technical Specification Group Services and System Aspects; System Architecture for the 5G System; Stage 2 (Release 15)", 3GPP TS 23.501, SA WG2, V15.0.0, Dec. 22, 2017 (Dec. 22, 2017). 181 pages.
3rd Generation Partnership Project "Technical Specification Group Services and System Aspects; System Architecture for the SG System; Stage 2 (Release 15)" 3GPP TS 23.501, SA WG2, V15.2.0, Jun. 19, 2018 (Jun. 19, 2018). 217 pages.
Huawei et al "Solution for Key Issue 5: NWDAF-Assisted QoS Profile Provisioning", 3GPP Draft ; S2-185177, May 27, 2018 (May 27, 2018). 6 pages.
Huawei, HiSilicon, Intel, Convida Wireless LLC, Telecom Italia, China Mobile, China Unicom, CATR SA WG2 Meeting #3127 "Solution for Key Issue 5: NWDAF-Assisted QoS Profile Provisioning" Apr. 16-20, 2018.

* cited by examiner

```
-- ASN1START

SPS-Config ::= SEQUENCE {
    semiPersistSchedC-RNTI          C-RNTI                          OPTIONAL,       -- Need OR
    sps-ConfigDL                    SPS-ConfigDL                    OPTIONAL,       -- Need ON
    sps-ConfigUL                    SPS-ConfigUL                    OPTIONAL        -- Need ON
}

SPS-Config-v1430 ::= SEQUENCE {
    ul-SPS-V-RNTI-r14               C-RNTI                          OPTIONAL,       -- Need OR
    sl-SPS-V-RNTI-r14               C-RNTI                          OPTIONAL,       -- Need ON
    sps-ConfigUL-ToAddModList-r14   SPS-ConfigUL-ToAddModList-r14   OPTIONAL,       -- Need ON
    sps-ConfigUL-ToReleaseList-r14  SPS-ConfigUL-ToReleaseList-r14  OPTIONAL,       -- Need ON
    sps-ConfigSL-ToAddModList-r14   SPS-ConfigSL-ToAddModList-r14   OPTIONAL,       -- Need ON
    sps-ConfigSL-ToReleaseList-r14  SPS-ConfigSL-ToReleaseList-r14  OPTIONAL        -- Need ON
    sps-ConfigSL-ToPauseList        SPS-ConfigSL-ToPauseList        OPTIONAL        -- Need ON
400 sps-ConfigSL-ToResumeList       SPS-ConfigSL-ToResumeList       OPTIONAL        -- Need ON
    sps-ConfigSL-ToShiftList        SPS-ConfigSL-ToShiftList        OPTIONAL        -- Need ON

}

SPS-ConfigUL-ToAddModList-r14 ::= SEQUENCE (SIZE (1..maxConfigSPS-r14)) OF SPS-ConfigUL SPS-ConfigUL-ToReleaseList-r14 ::= SEQUENCE (SIZE (1..maxConfigSPS-r14)) OF SPS-ConfigIndex-r14

SPS-ConfigSL-ToAddModList-r14 ::= SEQUENCE (SIZE (1..maxConfigSPS-r14)) OF SPS-ConfigSL-r14

SPS-ConfigSL-ToReleaseList-r14 ::= SEQUENCE (SIZE (1..maxConfigSPS-r14)) OF SPS-ConfigIndex-r14

SPS-ConfigSL-ToPauseList ::= SEQUENCE (SIZE (1..maxConfigSPS)) OF SPS-ConfigSL
402
    SPS-ConfigSL-ToResumeList ::= SEQUENCE (SIZE (1..maxConfigSPS)) OF SPS-ConfigIndex

...

SPS-ConfigSL-r14 ::= SEQUENCE {
    sps-ConfigIndex-r14             SPS-ConfigIndex-r14,
    semiPersistSchedIntervalSL-r14  ENUMERATED {
                                        sf20, sf50, sf100, sf200, sf300, sf400,
                                        sf500, sf600, sf700, sf800, sf900, sf1000,
                                        spare4, spare3, spare2, spare1}
}
    SPS-ConfigSL-ToShiftList ::= SEQUENCE {
        sps-ConfigIndex                     SPS-ConfigIndex-r14,
        semiPersistSchedIntervalSL-shiftOffset  ENUMERATED {
404                                             sf20, sf50, sf100, sf200, sf300, sf400,
                                                sf500, sf600, sf700, sf800, sf900, sf1000,
                                                spare4, spare3, spare2, spare1}
    }

SPS-ConfigIndex-r14 ::=             INTEGER (1..maxConfigSPS-r14)
```

Fig. 7

```
HandoverRequest-IEs X2AP-PROTOCOL-IES ::= {
    { ID id-Old-eNB-UE-X2AP-ID              CRITICALITY reject TYPE UE-X2AP-ID
                PRESENCE mandatory} |
    { ID id-Cause                           CRITICALITY ignore TYPE Cause
                PRESENCE mandatory} |
    { ID id-TargetCell-ID                   CRITICALITY reject TYPE ECGI
                PRESENCE mandatory} |
    { ID id-GUMMEI-ID                       CRITICALITY reject TYPE GUMMEI
                PRESENCE mandatory} |
    { ID id-UE-ContextInformation           CRITICALITY reject TYPE UE-ContextInformation
                PRESENCE mandatory} |
    { ID id-UE-HistoryInformation           CRITICALITY ignore TYPE UE-
    ...
```

406 {
```
    { ID id-UE-V2XResourcePoolStatusInformation    CRITICALITY ignore TYPE UE-
      V2XResourcePoolStatusInformation      PRESENCE MANDATORY}
    }
```

```
    UE-ContextInformation ::= SEQUENCE {
        mME-UE-S1AP-ID                      UE-S1AP-ID
        uESecurityCapabilities              UESecurityCapabilities,
        aS-SecurityInformation              AS-SecurityInformation,
        uEaggregateMaximumBitRate           UEaggregateMaximumBitRate,
        subscriberProfileIDforRFP           SubscriberProfileIDforRFP    OPTIONAL,
        e-RABs-ToBeSetup-List               E-RABs-ToBeSetup-List,
        rRC-Context                         RRC-Context,
        handoverRestrictionList             HandoverRestrictionList      OPTIONAL,
        locationReportingInformation        LocationReportingInformation OPTIONAL,
        iE-Extensions                       iProtocolExtensionContainer  {
    {UE-ContextInformation-ExtIEs} } OPTIONAL,
    ...
```

408 {
```
    UE-V2XResourcePoolStatusInformation ::= SEQUENCE {
    RP_Occupancy_Threshold,
    UL_Traffic_load, DL_Traffic_Load
    Interference_Level,
    QCI/5QI,
    }
    QCI/5QI :: {Resource Type, priority level, packet delay budget, packet error rate, averaging
    window (window in which Guaranteed Bit Rate (GBR)), maximum data burst volume
    APR
    Reflective QoS
    GBR/MBR
    Notification Control
    Maximum Packet Loss Rate
    }
```

Fig. 11

```
-- ASN1START

MobilityControlInfo ::=        SEQUENCE {
    targetPhysCellId              PhysCellId,
    carrierFreq                   CarrierFreqEUTRA                    OPTIONAL, --
Cond HO-toEUTRA2
    carrierBandwidth              CarrierBandwidthEUTRA               OPTIONAL, --
Cond HO-toEUTRA
    additionalSpectrumEmission    AdditionalSpectrumEmission          OPTIONAL, --
Cond HO-toEUTRA
    t304                          ENUMERATED {
                                      ms50, ms100, ms150, ms200, ms500, ms1000,
                                      ms2000, ms10000-v1310},
    newUE-Identity                C-RNTI,
    radioResourceConfigCommon     RadioResourceConfigCommon,
    rach-ConfigDedicated          RACH-ConfigDedicated                OPTIONAL, --
Need OP
    ...,
MobilityControlInfoV2X ::=     SEQUENCE {
    v2x-CommTxPoolExceptional-r14    SL-CommResourcePoolV2X-r14       OPTIONAL, --
Need OR
    v2x-CommRxPool-r14               SL-CommRxPoolListV2X-r14         OPTIONAL, --
Need OR
    v2x-CommSyncConfig-r14           SL-SyncConfigListV2X-r14         OPTIONAL, --
Need OR
    cbr-MobilityTxConfigList-r14     SL-CBR-CommonTxConfigList-r14    OPTIONAL, --
Need OR
    v2x-RPSI-feedback                v2x-RPSI-feedback                OPTIONAL, --
    Need OR
}
```

410 { (braces around last three lines: v2x-RPSI-feedback / Need OR / } )

Fig. 12

REALLOCATION AND RESERVATION OF RESOURCES FOR HIGH PRIORITY COMMUNICATION AND QUALITY OF SERVICE FEEDBACK

CROSS-REFERENCE TO RELATED APPLICATIONS

This application is a continuation of copending International Application No. PCT/EP2019/069765, filed Jul. 23, 2019, which is incorporated herein by reference in its entirety, and additionally claims priority from European Application No. 18188372.9, filed Aug. 9, 2018, which is also incorporated herein by reference in its entirety.

The present application concerns the field of wireless communications, more specifically to approaches for a reallocation and reservation of resources for high priority communications, for a Quality of Service, QoS, feedback, and for handling certain events in a wireless communication network. Embodiments relate to the implementation of such approaches for entities of a wireless communication network or system performing sidelink communications like V2X Mode 3 or Mode 4 UEs.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground-based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells; however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, New Radio, standard.

A wireless communication network as described above may be used by an application to provide a certain service to a UE in the RAN with a certain Quality of Service, QoS. The QoS may be monitored in the wireless communication network. For example, in LTE the QoS may be determined per Evolved Packet System, EPS, bearer as described in detail in reference [1], while in NR the QoS may be determined on a per flow basis as is described in detail in reference [2]. Reference [2] refers to the Allocation/Retention Priority (ARP), which determines if a pre-allocated resource should be reallocated based on a higher priority service in LTE and NR. The ARP has a range of 1-15 levels and may be described by the pre-emption capability, which defines whether a service data flow may get resources that were already assigned to another service data flow with a lower priority level, and by the pre-emption vulnerability information which defines whether a service data flow may lose the resources assigned to it in order to admit a service data flow with higher priority level. The pre-emption capability and the pre-emption may consist of a 'yes' or 'no' flag depending on the priority of the service as is described in reference [3]. The ARP may be considered when creating a new EPS bearer in a fully loaded wireless network. i.e., a network currently having insufficient resources. An emergency VoIP call is a typical example, where an existing bearer is removed in the event that an emergency call has to be made.

In the context of LTE, the network entities that handle the monitoring and the reporting to an application server in EPS are the Service Capability Exposure Function (SCEF), and the Mobility Management Entity (MME). The 3GPP Architecture for Service Capability Exposure in EPS is described in detail in reference [4] with reference to FIGS. 4.2-2. The procedure of monitoring event configuration and deletion at the MME/SGSN is also described in detail in reference [4] with reference to FIG. 4.2.

In the context of NR, the network entities which handle monitoring and reporting to application server in 5GS are the Access and Mobility Management (AMF) and the Network Exposure Function (NEF). The Event Exposure using NEF is described in detail in reference [5] with reference to FIG. 4.15.3.2.3-1, and a list of event-based monitoring capabilities and the corresponding network function (NF), which detects the event, is indicated in Table 4.15.3.1-1 of reference [5].

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1, rather, it means that these UEs are not connected to a base station, for example, they are not in an RRC connected state. Yet another scenario is called a "partial coverage" scenario, in accordance with which one of the two UEs which communicate with each other over the sidelink, is served by a base station, while the other UE is not served by the base station.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 3 configuration.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 4 configuration. As mentioned above, the scenario in FIG. 3 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 2, in addition to the mode 3 UEs 202, 204 also mode 4 UEs 206, 208, 210 are present.

When a vertical application, e.g. a V2X application, is run over a cellular network, like a 3GPP EPS or 5GS, information regarding a network situation, e.g. congestion, may help the application to adjust itself to the network capability. The network situation may include the status of the network at the moment and/or the prediction of the status of the network. When considering V2X as an example application, the importance of network status feedback may be explained for various scenarios and use cases.

The benefit and necessity of a network feedback to the application has been recognised for the V2X application in 3GPP standardization:

"In a V2X scenario, for a given CoR (category of requirements), the LoA (Level of Automation) can be adjusted in the range between 1 and 5 and this adjustment in LoA may be a result of a particular network situation (e.g. congestion). The V2X application may monitor the network situation and adapt the LoA for a given CoR corresponding to a V2X scenario. This change in LoA should also be communicated to the V2X UE by the V2X application server." [3GPP TR 23.795 clause 5.2]

"[AR-6.3.2-a] The V2X application enabler server shall enable V2X application specific server to monitor network situation and monitoring the QoS for single V2X UE or aggregately for groups of V2X UEs (supporting a V2X service and being in proximity) having ongoing sessions." [3GPP TR 23.795 clause 6.3.2]

"[AR-6.3.2-b] The 3GPP network system (EPS/5GS) shall be able to report the change in the QoS for V2X UEs, to the V2X application enabler server." [3GPP TR 23.795 clause 6.3.2]

In a conventional 5G Core Network, 5GC, in case the bit rate of a GBFR (guaranteed flow bit rate) drops below the guaranteed rate, a notification is sent to the application. However:

this notification is limited to GFBR traffic and is not applicable for other flow types;

this notification does not exist in case of any other QoS factor drop, e.g. delay or PDB;

there is no notification to inform the application about improvement in the rate or any other QoS factors, e.g. RAN bit rate.

Thus, the conventional notification cannot handle network monitoring needed by the vertical application such as V2X. In addition to the notification mechanism, in core networks of conventional systems, like EPC and 5GC, there is a mechanism to expose some events or capabilities of the network to the application. However, such network exposure capability functionalities for the reliable and efficient performance of a vertical application such as V2X. Therefore, conventional approaches dealing with the handling of high priority transmissions and the handling of QoS are not sufficient in many situations, like in vehicular scenarios in which limited resources or certain events in the system need to be addressed.

It is noted that the information in the above section is only for enhancing the understanding of the background of the invention and therefore it may contain information that does not form conventional technology that is already known to a person of ordinary skill in the art.

SUMMARY

According to an embodiment, a wireless communication system may have: a radio access network, RAN, the RAN including a plurality of transmitters and receivers, and a core network, CN, coupled to the RAN, wherein an application server is connectable to the core network, CN, the application server configured to run an application, the application configured to provide a certain service to a receiver in the RAN, wherein the wireless communication system is configured to obtain a status of at least a part of the RAN, and to inform the application and/or the receiver running the service provided by the application about the RAN status and/or any changes of the RAN status, wherein a performance of the service depends on the RAN status, so that the application can accordingly correct its requirements.

Another embodiment may have a transmitter for a wireless communication system, the wireless communication system providing a predefined set of resources including a plurality of resources to be allocated for respective transmissions, the transmissions including one or more first transmissions having a first priority level and one or more second transmissions having a second priority level, the first priority level being higher than the second priority level, wherein, in case there are not sufficient resources from the set of resources for an upcoming first transmission, the transmitter is configured to signal to a receiver to stop an ongoing second transmission so as to release resources used by the second transmission, and reallocate the released resources for the first transmission.

Another embodiment may have a transmitter for a wireless communication system, the wireless communication system providing a set of set of resources including a plurality of resources to be allocated for respective transmissions, the transmissions including one or more first transmissions having a first priority level and one or more second transmissions having a second priority level, the first priority level being higher than the second priority level, wherein, in case an occupancy of the set of resources reaches a predefined threshold, the transmitter is configured to reserve a certain amount of non-occupied resources from the set of resources for the first transmissions, and allocate reserved resources for a first transmission.

According to another embodiment, a wireless communication system may have: an application server, the application server configured to run an application, the application configured to provide a certain service to a receiver in the RAN, a core network to which the application server is connected, and a radio access network, RAN, coupled to the core network, the RAN including a plurality of transmitters and receivers, wherein the core network is configured to send a push notification to the application, e.g. application server or application client, the push notification indicating that a certain event occurred.

According to another embodiment, a method for operating a wireless communication system may have the steps of: a radio access network, RAN, the RAN including a plurality of transmitters and receivers, and a core network, CN, coupled to the RAN, wherein an application server is connectable to the core network, CN, the application server configured to run an application, the application configured to provide a certain service to a receiver in the RAN, the method including obtaining a status of at least a part of the RAN, and informing the application and/or the receiver running the service provided by the application about the RAN status and/or any changes of the RAN status, wherein a performance of the service depends on the RAN status, so that the application can accordingly correct its requirements.

Another embodiment may have a computer readable medium having stored thereon a computer program including instructions which, when executed by a computer, cause the computer to carry out a method for operating a wireless communication system including a radio access network, RAN, the RAN including a plurality of transmitters and receivers, and a core network, CN, coupled to the RAN, wherein an application server is connectable to the core network, CN, the application server configured to run an application, the application configured to provide a certain service to a receiver in the RAN, the method having the step of obtaining a status of at least a part of the RAN, and informing the application and/or the receiver running the service provided by the application about the RAN status and/or any changes of the RAN status, wherein a performance of the service depends on the RAN status, so that the application can accordingly correct its requirements.

BRIEF DESCRIPTION OF THE DRAWINGS

Embodiments of the present invention will be detailed subsequently referring to the appended drawings, in which:

FIG. 7 illustrates a SPS-config Information Element, IE modified in accordance with embodiments of the present invention;

FIG. 11 illustrates an embodiment for a HandoverRequest IE extended according to embodiments of the present invention;

FIG. 12 illustrates an embodiment for MobilityControlInfo IE extended according to embodiments of the present invention;

DETAILED DESCRIPTION OF THE INVENTION

Figure 1:
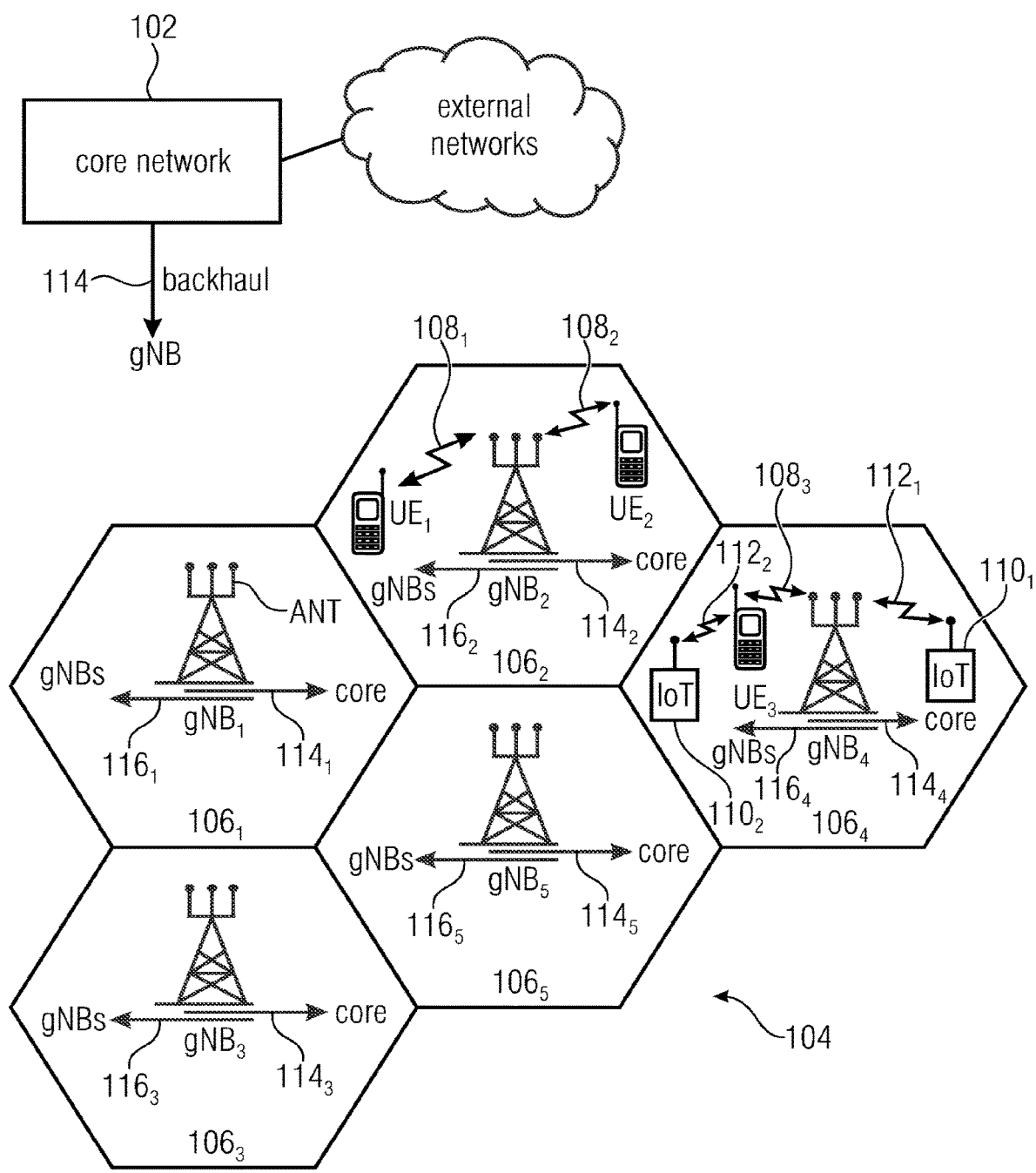
FIG. 1 shows a schematic representation of an example of a wireless communication system.

Embodiments of the present invention is now described in more detail with reference to the accompanying drawings in which the same or similar elements have the same reference signs assigned.

3GPP defines several use cases for NR V2X, like vehicle platooning, extended sensors, advanced driving and remote driving. To realize such use cases, the new technologies used in 5G NR may be incorporated along with the reuse of existing LTE V2X mechanisms. 5G NR networks accommodate multiple numerologies and subcarrier spacings, SCS, so that NR V2X networks may use multiple resource pools bearing different SCS. The selection of the relevant resource pool with a given SCS may depend on the application service requesting for resources to transmit. It is up to the application to decide the expected QoS level from the network depending on the offered service. For example, in LTE, there are 8 different levels of priority and reliability that may be assigned to different application services for V2X broadcast services. In an example where an application requests for a high priority, a resource pool numerology with a higher SCS may be selected primarily in order to meet the latency requirements. A base station BS may ensure that it meets the priority and reliability requirements in mode 3 operations. NR currently supports the following numerologies:

| SCS supported in NR (see references [6] and [7]) | | | | |
|---|---|---|---|---|
| μ | $\Delta f = 2^\mu \cdot 15[kHz]$ | Cyclic prefix | Slot length | Slots per subframe |
| 0 | 15 | Normal | 1 ms | 1 slot |
| 1 | 30 | Normal | 0.5 ms | 2 slots |
| 2 | 60 | Normal, Extended | 0.25 ms | 4 slots |
| 3 | 120 | Normal | 0.125 ms | 8 slots |
| 4 | 240 | Normal | 0.0625 ms | Only used for synch, not for data. |

The initial vehicle-to-everything, V2X, specification is included in Release 14 of the 3GPP standard. The scheduling and assignment of resources is modified according to the V2X requirements, when compared to the original device-to-device, D2D, communication standard. Cellular V2X operates in the above mentioned two configurations from a resource allocation perspective—mode 3 and mode 4. V2X UEs operating in mode 3 obtain the scheduling information for sidelink, SL, transmissions from the base station, like a BS, an eNB or a gNB, whereas mode 4 UEs autonomously carry out the resource selection. The vehicles may also transmit the messages in one of two ways—either in regular intervals over a duration of time, which is called Semi-Persistent Scheduled, SPS, transmissions, or only once at a single instance, called One Shot, OS, transmissions. For each of these transmissions, there are ProSe per packet priority (PPPP) and a ProSe per packet reliability (PPPR) indicators attached to each broadcasted packet, which dictate the level of priority and reliability needed for the said packet from a given application.

Enhanced V2X addresses the achievement of a certain Quality-of-Service, QoS, for a given application service. For example, when a resource pool is highly loaded with traffic, like V2X traffic, meaning there is a high occupancy in the pool, the BS may not be able to provide the expected QoS requirements for a given application, in the case of mode 3 SL transmission. In the case of mode 4 SL transmission, UEs may allocate resources autonomously, without any guarantee on the QoS requirements.

A problem with conventional implementations is that certain critical applications, especially applications that transmit messages of high priority and demand high reliability, may not be able to function as expected in such a scenario, thereby affecting the performance of the desired service. Also, there is possibility to convey back from the RAN to an application any information that a needed QoS cannot be met.

This is addressed by the various aspects of the present invention which are described hereinbelow in more detail. Although the respective aspects will be described separately, it is noted that two or more or all of the aspects may be combined.

$1^{st}$ Aspect: Sidelink Pause/Resume/Shift Priority

Figure 2:
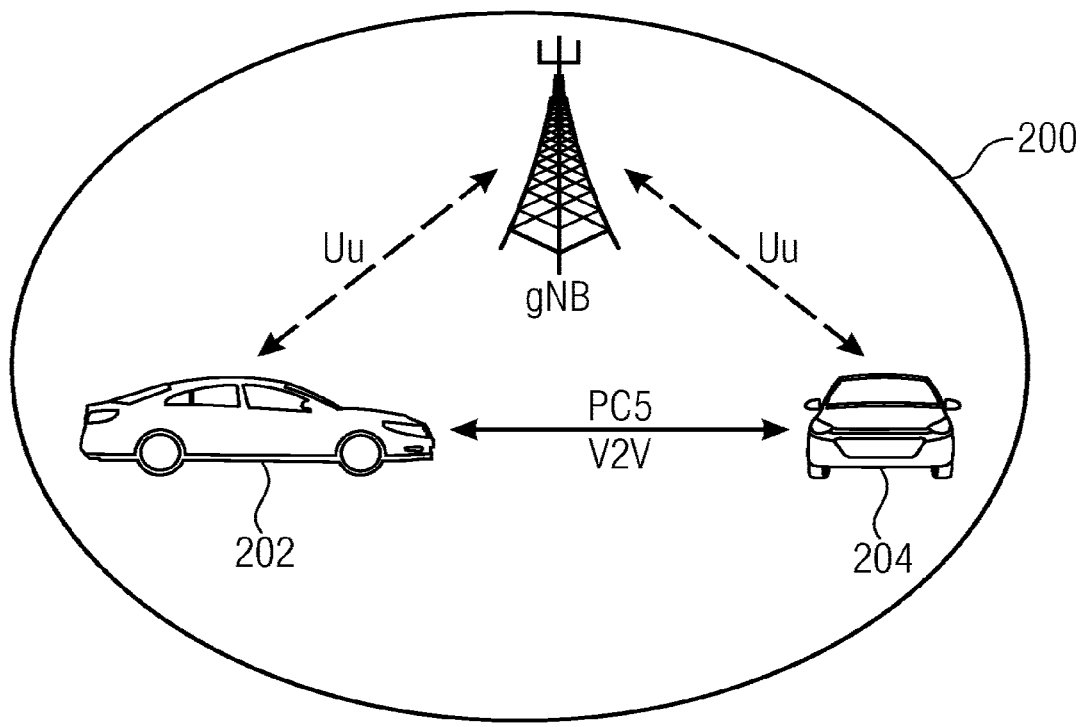
FIG. 2 shows a schematic representation of a situation in which UEs directly communicating with each other are in coverage of a base station.
Figure 3:
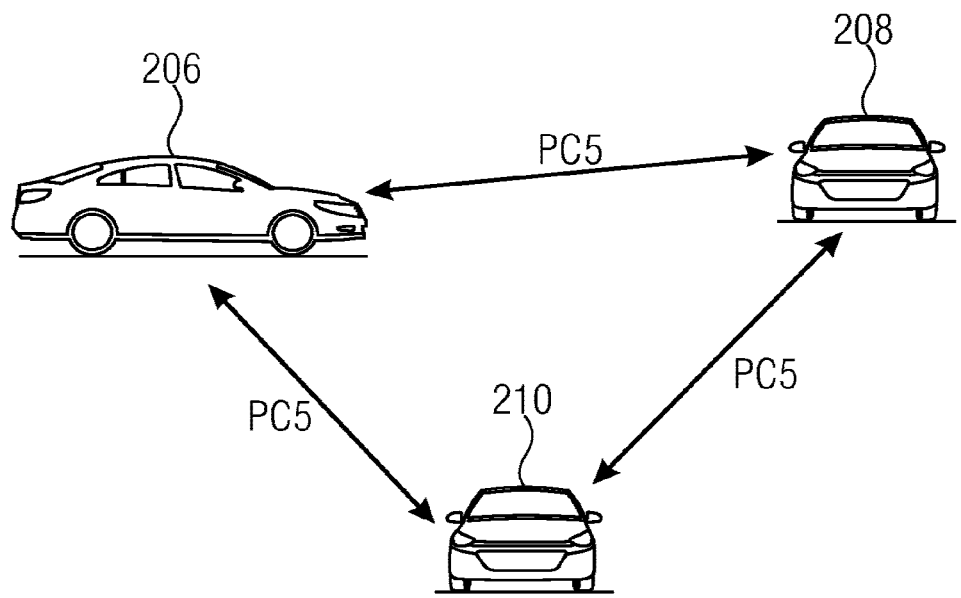
FIG. 3 shows a scenario in which UEs directly communicating with each other are not are not in coverage of a base station, i.e., are not connected to a base station.
Figure 4:
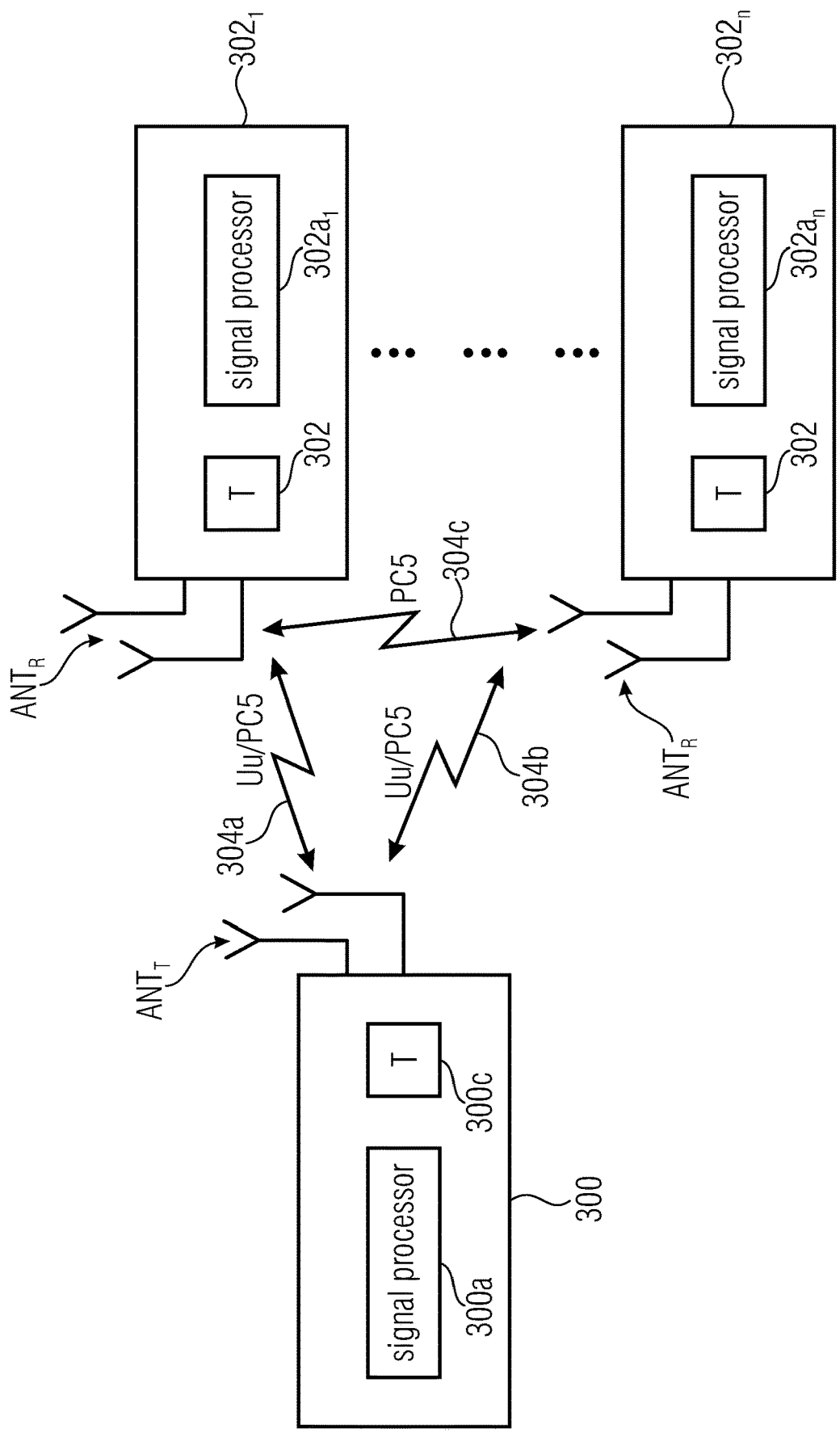
FIG. 4 is a schematic representation of a wireless communication system for communicating information between a transmitter and one or more receivers in accordance with embodiments of the present invention.

Embodiments of the first aspect of the present invention may be implemented in a wireless communication system as depicted in FIG. 1, FIG. 2 and FIG. 3 including base stations and users, like mobile terminals or IoT devices. FIG. 4 is a schematic representation of a wireless communication system for communicating information between a transmitter 300 and one or more receivers $302_1$ to $302_n$. The transmitter 300 and the receivers 302 may communicate via a wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other.

In accordance with an embodiment, as for example also depicted in FIG. 2, the transmitter 300 may be a base station and the receivers may be UEs. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface.

In accordance with an embodiment, as for example also depicted in FIG. 3, the transmitter 300 may be a first UE and the receivers may be further UEs. The first UE 300 and the further UEs 302 may communicate via respective wireless communication links 304a to 304c, like a radio link using the PC5 interface.

The transmitter 300 and the one or more receivers 302 may operate in accordance with the inventive teachings described herein.

Sidelink Pause/Resume/Shift Priority

The present invention provides an apparatus for a wireless communication system, the wireless communication system providing a set of resources including a plurality of resources to be allocated for respective transmissions, the transmissions including one or more first transmissions having a first priority level and one or more second transmissions having a second priority level, the first priority level being higher than the second priority level,
wherein the apparatus is configured to receive a signal, in case there are not sufficient resources from the set of resources for an upcoming first transmission, and
wherein the signal causes the apparatus to stop an ongoing second transmission so as to release resources for transmitting or receiving the first transmission.

In Accordance With Embodiments:
stopping the ongoing second transmission comprises pausing the second transmission for a predefined time or pause interval, and
the signal comprises a message indicating a pause interval over which the second transmission is to be paused, the interval selected to accommodate for the transmission or the reception of the first transmission.

In accordance with embodiments, the message further indicates a configuration to be used when resuming the second transmission once the first transmission has been completed, the message indicating a configuration to be used upon resuming the second transmission, the configuration being
  the same configuration used for the initial second transmission, or
  one of a plurality of other configurations known at the apparatus, or a new configuration.

In Accordance With Embodiments:
the respective transmissions include at least one or more third transmissions having a third priority level, the first priority level and the second priority level being higher than the third priority level, and the wireless communication system provides a plurality of sets of resources, the plurality of sets of resources including a first set of resources including resources to be allocated for the first and second transmissions, and a second set of resources including resources to be allocated for the third transmissions.

In accordance with embodiments, the resources include a plurality of subcarriers, a subcarrier spacing, SCS, of the resources of the first set of resources being higher than the SCS of the resources of the second set of resources.

In Accordance With Embodiments:
a transmission has associated therewith a certain low latency and/or high reliability and/or a given quota requirement to ensure that an application service meets a needed Quality-of-Service, QoS, and
stopping the ongoing second transmission on the resources to be released comprises reallocating resources for the second transmission in the second set of resources, if the certain low latency and high reliability and quota requirements of the second transmission can be met.

In accordance with embodiments, the second transmission is buffered in a buffer of the apparatus, wherein the apparatus is configured to flush the buffered second transmission from the buffer
  if a communication range to a target of the second transmission has exceeded a maximum communication range, or
  if the first transmission has exceeded a timer.

In Accordance With Embodiments:
the first transmission comprises a message having associated therewith the first priority, and the second transmission comprises a message having associated therewith the second priority, and
the first message comprises one or more of an emergency message and a safety related message, like accident warning messages, road hazard warnings or incoming emergency vehicle messages.

In Accordance With Embodiments:
the wireless communication system includes a plurality of base stations, gNBs, and a plurality of user devices, UE, wherein the apparatus comprises a UE,
the UE is coupled to one or more other UEs via a sidelink, and
the UE is configured for a sidelink communication with the one or more other UEs, and
wherein the resources from the set of resources for the sidelink communication with the one or more other UEs are scheduled by the eNB.

In Accordance With Embodiments:
the wireless communication system includes a plurality of user devices, UEs, wherein the apparatus comprises a UE, the UE is coupled to one or more other UEs via a sidelink, and
the UE is configured for a sidelink communication with the one or more other UEs, wherein the UE is configured to schedule the resources from the set of resources for the sidelink communication autonomously.

In accordance with embodiments, the signal includes a sidelink control information, SCI, message causing the one or more other UEs, which occupy resources stated in the SCI message to be used for the first transmission, to pause or shift the second transmission.

In accordance with embodiments, a priority of a message is statically mapped to a corresponding service.

In accordance with embodiments, the set of resources comprises a plurality of contiguous or non-contiguous resources across a frequency domain and adjacent or non-adjacent across a time domain.

In accordance with embodiments, the set of resources defines a resource pool.

The present invention provides a transmitter for a wireless communication system, the wireless communication system providing a predefined set of resources including a plurality of resources to be allocated for respective transmissions, the transmissions including one or more first transmissions having a first priority level and one or more second transmissions having a second priority level, the first priority level being higher than the second priority level, wherein, in case there are not sufficient resources from the set of resources for an upcoming first transmission, the transmitter is configured to
    signal to a receiver to stop an ongoing second transmission so as to release resources used by the second transmission, and
    reallocate the released resources for the first transmission.

In accordance with embodiments, the transmitter is configured to determine
    that a percentage of used resources from the set of resources reached a predefined threshold or that a percentage of unused resources from the set of resources dropped below a predefined threshold, or
    that there are not enough unused resources in the set of resources for allocation to the first transmission.

Thus, in accordance with embodiments of the first aspect, the transmitter may carry out resource allocation in a highly congested resource pool, due to its capability of interrupting a transmission of a lower priority, for which the resources have already been granted. For example, in the case where UEs are out of coverage and operating in mode 4 (see FIG. 3), a UE may send a sidelink control information (SCI) message for a transmission of higher priority, say an emergency or safety related message, and other UEs occupying the resources stated in the SCI of higher transmission may pause or shift their transmission of lower priority, thereby giving preference to the transmission of higher priority. In accordance with embodiments, the MAC layer may be responsible for the priority handling of packets arriving at the physical layer, and in case where a lower priority message has already been allocated a grant in a congested resource pool and already begun transmitting on the SL, the inventive solution allows to reallocate resources to a higher priority message. In accordance with embodiments, network entities, like a BS or a UE, may pause or shift a transmission of lower priority so that the resources may be reallocated for transmissions of higher priority. Further, the BS may reallocate resources for the second transmission in an alternative resource pool depending on the QoS criteria, e.g., into resource pool of a lower SCS for the transmission of lower priority, if the requirements of the said transmission can be met.

In case of Mode 3 UEs, embodiments may support a signaling of a SPS pause or shift. Since resources may be reserved for transmissions only in a semi-persistently scheduled (SPS) manner, in accordance with embodiments, a new parameter in the SPS configurations may be used for describing a pause or shift interval or a reduced frequency interval (SPS interval).

In case of Mode 4 UEs, embodiments cause a UE occupying a resource for lower priority transmissions to pause or shift the transmission until the transmission of higher priority has been completed. The priority of the transmitted packets may be mapped to a corresponding V2X service and may be assumed to be static and secure, e.g., the mapping may be hard-coded, so as to prevent V2X applications from interfering and manipulating the priority for its own advantage gain in the case of Mode 4 UEs.

$2^{nd}$ Aspect:

Embodiments of the second aspect of the present invention may be implemented in a wireless communication system as depicted in FIG. 1, FIG. 2 and FIG. 3 including base stations and users, like mobile terminals or IoT devices, as also described above with reference to FIG. 4. The transmitter 300 and the one or more receivers 302 may operate in accordance with the inventive teachings described herein.

Occupancy Threshold

The present invention provides a transmitter for a wireless communication system, the wireless communication system providing a set of set of resources including a plurality of resources to be allocated for respective transmissions, the transmissions including one or more first transmissions having a first priority level and one or more second transmissions having a second priority level, the first priority level being higher than the second priority level, wherein, in case an occupancy of the set of resources reaches a predefined threshold, the transmitter is configured to
    reserve a certain amount of non-occupied resources from the set of resources for the first transmissions, and
    allocate reserved resources for a first transmission.

In accordance with embodiments, the transmitter is configured to reserve the certain amount of non-occupied resources when a certain occupancy or traffic load threshold has been reached.

In accordance with embodiments, once the occupancy or traffic load threshold has been reached, the transmitter is configured to
    start allocating reserved resources only for a first transmission, and
    stop allocating resources for a second transmission.

In Accordance With Embodiments:

the respective transmissions include at least a third transmission having a third priority level, the first priority level and the second priority level being higher than the third priority level, and the wireless communication system provides a plurality of sets of resources, the plurality of sets of resources including a first set of resources including resources to be allocated for the first and second transmissions, and a second set of resources including resources to be allocated for the third transmissions.

In Accordance With Embodiments:

a transmission has associated therewith a certain low latency and/or high reliability requirement and/or quota requi
rement to ensure that an application service meets a needed Quality-of-Service, QoS, and responsive to stopping allocating resources for the second transmission, the transmitter is configured to allocating resources for the second transmission in the second set of resources, if the certain low latency and/or high reliability and/or quota requirements of the second transmission can be met.

In accordance with embodiments, the resources include a plurality of subcarriers, a subcarrier spacing, SCS, of the resources of the first set of resources being higher than the SCS of the resources of the second set of resources.

In accordance with embodiments, the transmitter is configured to select the amount of resources to be reserved for the first transmissions based on a real-time load or based on an anticipated load of the set of resources.

In Accordance With Embodiments:
the wireless communication system includes a plurality of base stations, gNBs, and a plurality of user devices, UE, wherein the transmitter comprises a gNB,
the UE is coupled to one or more other UEs via a sidelink, and
the UE is configured for a sidelink communication with the one or more other UEs, and
wherein the resources from the set of resources for the sidelink communication with the one or more other UEs are scheduled by the gNB.

In Accordance With Embodiments:
the wireless communication system includes a plurality of user devices, UEs, wherein the transmitter comprises one of the UEs,
the UE is coupled to one or more other UEs via a sidelink, and
the UE is configured for a sidelink communication with the one or more other UEs, wherein the UE is configured to schedule the resources from the set of resources for the sidelink communication autonomously.

In accordance with embodiments, the set of resources comprises a plurality of contiguous or non-contiguous resources across a frequency domain and adjacent or non-adjacent across a time domain.

In accordance with embodiments, the set of resources defines a resource pool.

Thus, embodiments of the second aspect revolve around pre-emptively securing resources in a resource pool for high priority transmissions with the condition that a certain occupancy or traffic load threshold has been reached. This is another embodiment to ensure that, e.g., high priority SL transmissions occur without a delay. A small set of fixed resources to be reserved for high priority transmissions may be based on a real-time load or on an anticipated load of the resource pool. The reservation, in accordance with embodiments, may be activated only once the occupancy of the resource pool has reached this pre-defined threshold.

Figure 5:
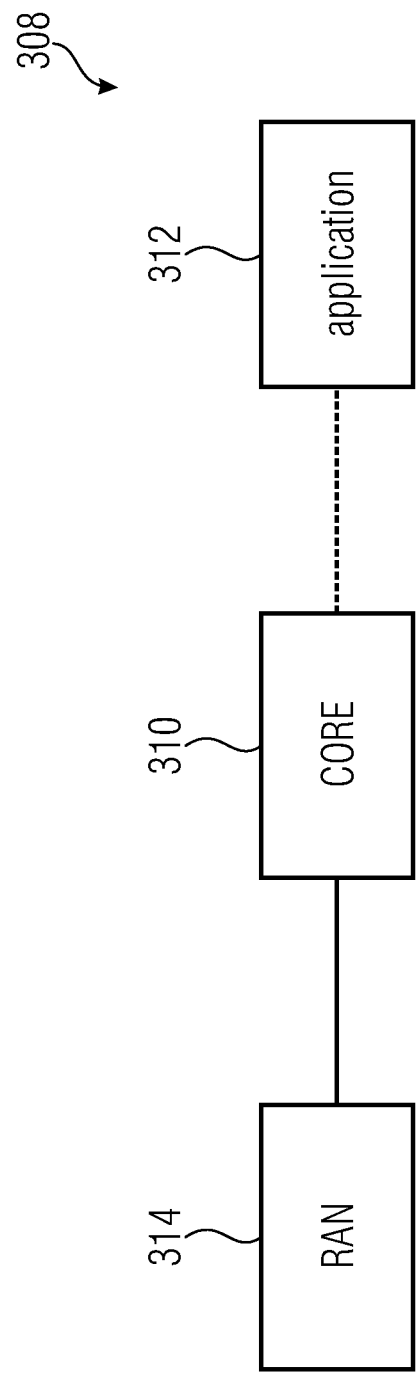
FIG. 5 is a schematic representation of a wireless communication system operable in accordance with the inventive teachings described herein.

3$^{rd}$ Aspect:

Embodiments of the third aspect of the present invention may be implemented in a wireless communication system as depicted in FIG. 1, FIG. 2 and FIG. 3 including base stations and users, like mobile terminals or IoT devices. FIG. 5 is a schematic representation of a wireless communication system 308 having a core network 310 to which an application server 312 is connectable. The application server runs an application to provide a certain service to a receiver with a certain Quality of Service, QoS. Further, the system includes a radio access network, RAN, 314 coupled to the core network 310, the RAN 314 including a plurality of transmitters and receivers. The wireless communication system 308 may operate in accordance with the inventive teachings described herein.

QOS Feedback

The present invention provides a wireless communication system, comprising
a radio access network, RAN, the RAN including a plurality of transmitters and receivers, and
a core network, CN, coupled to the RAN, wherein an application server is connectable to the core network, CN, the application server configured to run an application, the application configured to provide a certain service to a receiver in the RAN,
wherein the wireless communication system is configured to obtain a status of at least a part of the RAN, and to inform the application and/or the receiver running the service provided by the application about the RAN status and/or any changes of the RAN status, wherein a performance of the service depends on the RAN status, so that the application can accordingly correct its requirements.

In accordance with the present invention:
the performance comprises a Quality-of-Service, QoS, and the application requests the network and/or wireless communication system to provide the service to the receiver with a certain QoS, and
the wireless communication system is configured to determine, using the RAN status, whether the certain QoS can be fulfilled or cannot be fulfilled by the RAN, and to signal to the application and/or to the receiver that the certain QoS can be fulfilled or cannot be fulfilled.

In accordance with the present invention, the wireless communication system is configured to obtain the status of the RAN
  responsive to a request from the application, or
  responsive to a certain event in the RAN, or
  at certain intervals, the intervals set, e.g., by the application.

In accordance with the present invention, the certain event in the RAN comprises one or more of
  a failure or malfunction of one or more RAN entities,
  a degradation or improvement of the radio coverage in the RAN,
  a handover of a UE from one cell in the RAN to another cell in the RAN,
  one or more UEs connecting to or disconnecting from the RAN, e.g. radio link failure.

In accordance with the present invention, the core network is configured to
  request a status report from the RAN, and/or subscribe to events from the RAN, and
  push the status report or event/s to the application,
  signal and/or report the status report or event/s to the application and/or to the application function (AF) and/or to network function (NF).

In accordance with the present invention, the RAN is configured to
  collect from one or more RAN entities data related to the status of the RAN,
  process the data for creating the status report and/or detect status event, and
  signal the status report and/or event/s to the core network.

In accordance with the present invention, the RAN comprises one or more base stations, gNBs, for serving respective UEs, the gNB configured to collect and process the data related to the status of the cell served by the gNB, and to signal and/or report the status report and/or event/s to the core network.

In accordance with the present invention, the gNB is configured to collect and process data related to the status of one or more cells served by other gNBs.

In accordance with the present invention:
the core network comprises a Network Data Analytics Entity or Function, NWDAF,
the RAN is configured to
  collect from one or more RAN entities data related to the status of the RAN, and
  signal the data to the core network, and
the NWDAF configured to
  process the data from the RAN for creating the status report, and/or detecting event/s, and/or predicting future status, and/or predicting probable or possible future event/s, and
  signal and/or report the status report and/or prediction to the application and/or the receiver.

In accordance with the present invention, the RAN comprises one or more base stations, gNBs, for serving respective UEs, the gNB configured to collect the data related to the status of the cell served by the gNB, and to signal the data to the NWDAF, through network functions (NFs) such as access and mobility function (AMF) and/or session management function (SMF).

In accordance with the present invention, the gNB is configured to collect and process data related to the status of one or more cells served by other gNBs.

In accordance with the present invention, the RAN is configured to
- collect from one or more RAN entities data related to the status of the RAN,
- process the data for creating a status report and/or detecting event/s, and
- signal and/or report the status report and/or event/s to the application and/or to the receiver running the service provided by the application.

In accordance with the present invention, the RAN comprises one or more base stations, gNBs, for serving respective UEs, the gNB configured to collect and process the data related to the status of the cell served by the gNB, and to signal and/or report the status report and/or event/s to the application and/or to the receiver running the service provided by the application.

In accordance with the present invention, the gNB is configured to collect and process data related to the status of one or more cells served by other gNBs.

In accordance with the present invention, the status report includes one or more of the following:
- signal traffic load in the RAN,
- resources in the RAN,
- congestion in the RAN,
- interference of all UEs of one or more cells in the RAN,
- QoS requirements achievable in the RAN.

In accordance with the present invention, the wireless communication system is configured to report that the certain QoS can be fulfilled or cannot be fulfilled responsive to the application request from the core network for a report on QoS or another RAN measure causing a change in achievable QoS.

In accordance with the present invention, the event includes a change in the RAN and/or network, e.g. congestion in the RAN, overload in the RAN, a degradation or improvement is supportable QoS.

In accordance with the present invention, the wireless communication system is configured to signal that the certain QoS can be fulfilled or cannot be fulfilled responsive to the application subscribing to a notification from the core network for a QoS change or another RAN events causing a change in achievable QoS.

In accordance with the present invention:
the RAN is configured to provide a set of resources including a plurality of resources to be allocated for respective transmissions, the transmissions including one or more first transmissions having a first priority level and one or more second transmissions having a second priority level, the first priority level being higher than the second priority level, and in the case the wireless communication system determines that the set of resources is completely occupied by first transmissions, the wireless communication system is configured to inform the application and/or the receiver that the certain QoS cannot be met.

In accordance with the present invention, the inventive wireless communication system comprises:
the application server connected to the core network, wherein, responsive to the signaling from the wireless communication system, the application and/or the receiver is configured to adapt to the changes in achievable QoS.

Thus, in accordance with embodiments of the third aspect, the communication system provides a path or mechanism or procedure to notify an application that a certain service with a desired QoS can/cannot be fulfilled from a RAN side. For example, in the case where a resource pool is completely occupied by high priority transmissions, the BS may inform the application or application server that, e.g., a needed priority and reliability (QoS), cannot be met, so as to allow the application to alter its behavior accordingly, say in the case of a fully autonomous car. The relevant network entities (in LTE) or network functions (in 5G) related to the application layer, may subscribe to monitor various changes in QoS related events or RAN events. These events may then be signaled back to the application function.

$4^{th}$ Aspect:

Embodiments of the fourth aspect of the present invention may be implemented in a wireless communication system as depicted in FIG. 1, FIG. 2, FIG. 3 and FIG. 5. The wireless communication system 308 may operate in accordance with the inventive teachings described herein.

Push Notification

The present invention provides a wireless communication system, comprising
an application server, the application server configured to run an application, the application configured to provide a certain service to a receiver in the RAN,
a core network to which the application server is connected, and
a radio access network, RAN, coupled to the core network, the RAN including a plurality of transmitters and receivers,
wherein the core network is configured to send a push notification to the application, e.g. application server or application client, the push notification indicating that a certain event occurred.

In accordance with embodiments, the core network is configured to
- monitor a situation or a status of the wireless communication system, and
- determine whether the certain event occurred in the wireless communication system.

In accordance with embodiments, the application server is configured to receive a push notification without an explicit subscription to corresponding events In accordance with embodiments, the push notification informs the application server of a critical event or a warning, such as
- a critical or severe situation or failure in the RAN or any other part of the system, e.g., in case of a natural disaster so that a part of the system is completely down; or
- a severe situation sensed by another application server, e.g., in case of V2X when an application server detects a dangerous situation on the road, like a severe accident, fire, etc., and requests the network to send push notification to all other application servers, e.g. V2X application server, that are active in the involved area; or
- a severe situation sensed by a UE, e.g. V2X UE, like a severe accident, fire, etc.

Thus, in accordance with embodiments of the fourth aspect, the application server may receive one or more push notifications, e.g., without explicit subscription to any corresponding event, so as to provide a path and/or a mechanism and/or a procedure for push notifications originating from various sources, e.g. the RAN, another application server, the core network, etc. Naturally, the scenarios mentioned here are examples only and the mentioned sources of push notifications are not exhaustive.

System

The present invention provides a wireless communication network, comprising:

at least one apparatus according to the invention, and at least one transmitter according to the invention.

In accordance with embodiments, the set of resources comprises a plurality of contiguous or non-contiguous resources across a frequency domain and adjacent or non-adjacent across a time domain.

In accordance with embodiments, the set of resources defines a resource pool.

In accordance with embodiments, the receiver and the transmitter comprise one or more of
- a mobile terminal, or
- stationary terminal, or
- cellular IoT-UE, or
- an IoT device, or
- a ground based vehicle, or
- an aerial vehicle, or
- a drone, or
- a moving base station, or
- road side unit, or
- a building, or
- any other item or device provided with network connectivity enabling the item/device to communicate using the wireless communication network, e.g., a sensor or actuator, and
- a macro cell base station, or
- a small cell base station, or
- a road side unit, or
- a UE, or
- a remote radio head, or
- an AMF, or
- an SMF, or
- a core network entity, or
- a network slice as in the NR or 5G core context, or
- any transmission/reception point (TRP) enabling an item or a device to communicate using the wireless communication network, the item or device being provided with network connectivity to communicate using the wireless communication network.

The present invention provides a wireless communication network, comprising at least one of the inventive UEs and at least one of the inventive base stations.

In accordance with embodiments, the receiver and the transmitter comprises one or more of: a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Methods

1. Aspect

The present invention provides a method for a wireless communication system, the wireless communication system providing a set of resources including a plurality of resources to be allocated for respective transmissions, the transmissions including one or more first transmissions having a first priority level and one or more second transmissions having a second priority level, the first priority level being higher than the second priority level, method comprising receiving a signal, in case there are not sufficient resources from the set of resources for an upcoming first transmission, and the signal causing stopping an ongoing second transmission so as to release resources for transmitting or receiving the first transmission.

The present invention provides a method for transmitting for a wireless communication system, the wireless communication system providing a predefined set of resources including a plurality of resources to be allocated for respective transmissions, the transmissions including one or more first transmissions having a first priority level and one or more second transmissions having a second priority level, the first priority level being higher than the second priority level, wherein, in case there are not sufficient resources from the set of resources for an upcoming first transmission, the method comprises:
- signaling to a receiver to stop an ongoing second transmission so as to release resources used by the second transmission, and
- reallocating the released resources for the first transmission.

2. Aspect

The present invention provides a method for transmitting for a wireless communication system, the wireless communication system providing a set of set of resources including a plurality of resources to be allocated for respective transmissions, the transmissions including one or more first transmissions having a first priority level and one or more second transmissions having a second priority level, the first priority level being higher than the second priority level, wherein, in case an occupancy of the set of resources reaches a predefined threshold, the method comprises:
- reserving a certain amount of non-occupied resources from the set of resources for the first transmissions, and
- allocating reserved resources for a first transmission.

3. Aspect

The present invention provides a method for operating a wireless communication system, comprising a radio access network, RAN, the RAN including a plurality of transmitters and receivers, and a core network, CN, coupled to the RAN, wherein an application server is connectable to the core network, CN, the application server configured to run an application, the application configured to provide a certain service to a receiver in the RAN, the method comprising obtaining a status of at least a part of the RAN, and informing the application and/or the receiver running the service provided by the application about the RAN status and/or any changes of the RAN status, wherein a performance of the service depends on the RAN status, so that the application can accordingly correct its requirements.

4. Aspect

The present invention provides a method for operating a wireless communication system according to the invention.

Computer Program Product

The present invention provides a computer program product comprising instructions which, when the program is executed by a computer, causes the computer to carry out one or more methods in accordance with the present invention.

Embodiments will now be described in more detail. In the following reference is made to a resource pool. However, the invention is not limited to resource pool, rather the inventive approach is equally applicable to any set of resources. The pool or set of may include a plurality of contiguous or non-contiguous resources across a frequency domain and adjacent or non-adjacent across a time domain. Thus, when referring in this specification to a resource pool this to be understood also as a reference to a set of resources.

First Aspect

Figure 6:
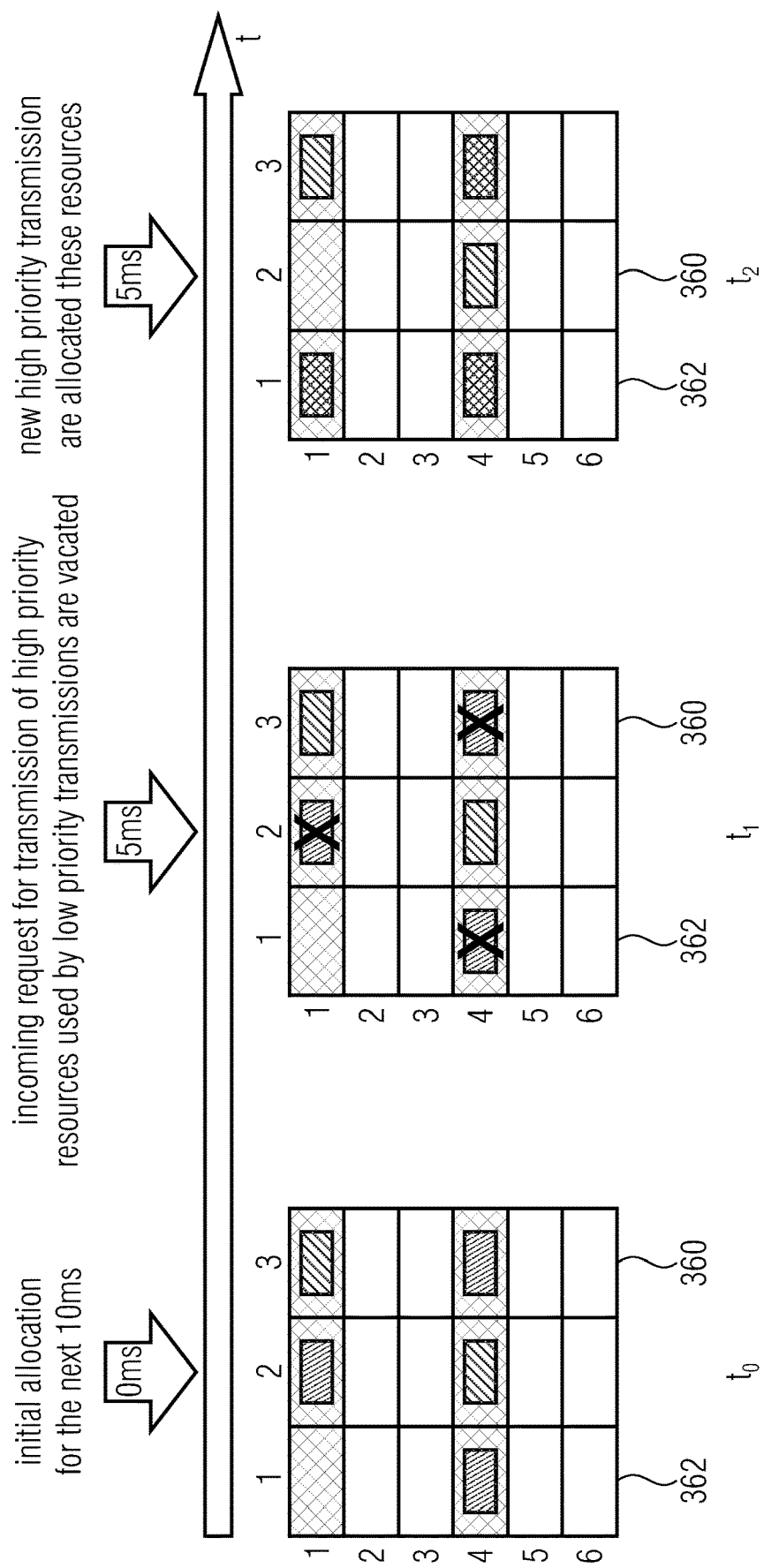
FIG. 6 illustrates the pausing of a transmission for releasing resources to be used for services with higher priority in accordance with embodiments of the present invention.

Embodiments of the first aspect of the present invention will now be described with reference to FIG. 4 and FIG. 6, of which FIG. 6 illustrates the pausing of a transmission for freeing or releasing resources to be used for services with higher priority. For the following description, it is assumed that the transmitter 300 of FIG. 4 is a base station, and the receivers 302 are UEs, which may or may not communicate also directly with each other over a sidelink 304c. In the latter case, the UEs may be V2X mode 3 UEs (see FIG. 2).

FIG. 6, schematically, illustrates a resource pool 360 including a plurality of resources 362, and the resource pool 360 is illustrated at different points in time, namely at a time $t_0$, at a later time $t_1$, e.g., 5 ms after the time $t_0$, and at time $t_2$ following $t_1$, e.g., 5 ms after the time $t_1$. It is assumed that the resource pool 260 includes columns 1-3 and rows 1-6 and, for a communication from the base station 300 towards the UE $302_1$ the resources in row 1 and the resources in row 3 of the resource pool 360 are available. At the time $t_0$, the base station 300 performs an initial allocation of the resources for a transmission to the UE $302_1$ for the next 10 ms. It is assumed that resources for two messages need to be allocated, and the messages are assumed to be of substantially the same priority, at least none of them needs a high priority transmission. For example, the first transmission has allocated two resources, the resources in column 3, row 1 and in column 2, row 4, as is indicated by the cross-hatched blocks, and the second transmission has allocated three resources, namely the resources in column 1, row 4, in column 2, row 1 and in column 3, row 4, as is indicated by the hatched blocks. Thus, in the depicted example only one resource at column 1, row 1 remains non-allocated.

At the time $t_1$, the base station 300 receives a request for a transmission of a high priority message that needs to be signaled with low latency to the UE $302_1$. It is assumed that three resources are needed for the high priority transmission, however, at this time, all resources, except for one resource, for a transmission to the UE $302_1$, are occupied, so that there are not sufficient resources available in the pool for the high priority transmission. Therefore, in accordance with the present invention, the base station determines, for example, which of the currently transmitted messages has the lowest priority, e.g., the first message. The base station releases the resources associated with the second transmission (see the crossed-out resources in FIG. 6) thereby freeing resources in column 1, row 4, column 2, row 1 and column 3, row 4 of the resource pool 300. At the next possible time, like time $t_2$, a resource allocation is carried out, so as to fully or at least partly allocate to the high priority transmission the released resources, as is indicated by the black boxes. The newly allocated resources at time $t_2$ may be used for a downlink transmission of the high priority message from the base station 300 to the UE $302_1$, or for an uplink transmission of the high priority message from the UE $302_1$ to the base station 300. The UE $302_1$ receives from the base station 300 a signal indicating that the transmission of the second transmission need to be stopped or paused because there are not sufficient resources in the pool for the high priority transmission so that the already allocated resources for the first transmission are released. The UE $302_1$ may either discard the first transmission or resume transmission at a later time, triggered by a pre-configured timer or signaled time value via RRC message or relayed via sidelink by another UE, once the high priority transmission is completed.

In accordance with other embodiments, in case the UEs also communicate via the sidelink interface, like the PC5 interface 304c in FIG. 4, the resources mentioned above with reference to FIG. 4 may be resources used for the sidelink communication so that the high priority message may be translated among the UEs $302_1$, $302_n$ via the PC5 interface 304c using resources obtained by the releasing resources allocated initially to low priority transmission on the sidelink in way as described above.

In the embodiment described above, it has been assumed that the high priority message is a downlink message towards the UEs so that the base station may receive a signaling, e.g., from an application running on an application server coupled to the core network of the wireless communication system. On the other hand, the signaling may also be received from a UE, in case a service or application running on the UE which needs a high priority uplink message to be transmitted to the base station. The apparatus may also be a UE communicating with anther UE via a sidelink interface, and either one of the UEs may receive from an associated service or application an indication or signaling that a high priority message is to be transmitted over the sidelink which needs releasing resources of an already scheduled or ongoing lower priority transmission.

In accordance with embodiments, stopping the lower priority transmission may include pausing the transmission for a predefined time or interval and resuming the transmission after the interval which has been selected so as to make sure that the higher priority transmission is securely accommodated. The first transmission may be resumed using the same configuration as before, or using a new configuration that may be selected from a list of existing configurations or that may be a new configuration provided for resuming the low priority transmission.

In accordance with embodiments, a plurality of resource pools may be provided, for example a higher priority resource pool having a higher subcarrier spacing, SCS. For example, there may be eight levels of reliability in the context of LTE (PPPR), and in NR there are 5QI or VQI indicators. Messages related to the highest three levels of priority may be associated with resources in a 60 kHz-SCS-resource pool which may be referred to as a high priority/low latency resource pool which is selected from a set of available resource pools for a transmission. In case the resource pool, namely the high priority/low priority resource pool is completely congested, the base station is not in a position to allocate any resources for a new transmission to allocate any resources for a new transmission, either over a sidelink between two UEs or over a link between the base station and one of the UEs. On the other hand, due to the low latency and/or high reliability and/or quota requirement of a high priority message, the BS may not reject any transmission of the highest priority, for example due to a safety critical nature of the message, like an emergency call or the like. In other words, high priority message may have a certain latency, reliability, and quota, like a data rate requirement, or any combination of these requirements. In this case, in accordance with the inventive approach, as explained above, the base station which has already sent out grants for a transmission of lower priority to UEs, like SPS transmissions, at the time to, when the resources were available, and in case the duration of the grant has not yet elapsed, the BS may withdraw the resources allocated for transmissions of lower priority in favor of transmissions of higher priority. In case multiple resource pools of different priority levels are provided, the BS may try to reallocate resources for the lower transmission into another resource pool of lower SCS, provided the requirements for the lower priority transmission are still met when using resources from the lower priority pool. In case no further pools are available or a reallocation to a lower priority pool does not meet the requirements of the transmission, the transmission of the lower priority message may be paused until the high priority message transmission has been completed. The reallocation being either done when using a new lower priority resource pool, or when resuming the transmission of the low priority message may be done by sending to the UE a revised or updated SPS configuration based on the resource pool load.

In accordance with examples, the base station may notify the UE transmitting low priority messages based on a buffer status report request from the UE transmitting message of higher priority so that, for example, once the base station knows the amount of resources needed for the duration for the transmission of messages of higher priority, the interval during which the UE stops or pauses transmitting the message of lower priority, may be determined. This enables the high priority messages to be transmitted in a highly congested dedicated/shared resource pool. Following the interval, the UE may then resume transmission of the low priority message using the resources it was originally allocated by the base station, or the low priority SPS transmission may be shifted in time using, for example, an offset to enable transmission of high priority messages. It is noted that the high priority messages may either be one shot transmissions or SPS transmissions.

In accordance with embodiments, in case of sidelink transmission modes a SPS transmission may be used and the base station requests the UE transmitting messages of lower priority to pause or shift the transmission in favor of the high priority transmission to or from the UE. In this scenario, the BS may use a revised SPS configuration with a new parameter stating the pause/shift of the interval, as is illustrated in FIG. 7 showing an embodiment for a SPS-config Information Element, IE. In accordance with embodiments of the present invention, the SPS-config IE, as it is described in reference [8], is extended by the elements "ToPauseList", "ToResumeList", "ToShiftList" as indicated at 400, 402 and 404 in FIG. 7. The "ToPauseList" indicates the SPS-configuration for the sidelink which has to be paused, the "ToResumeList" indicates which of the available SPS-configurations is used upon resuming the low priority transmission, and the "ToShiftList" indicates the duration for which the transmission of the low priority transmission is paused. In case no "ToResumeList" is indicated, the initial configuration used for the low priority transmission will also be used upon resuming transmission.

Thus, the above-mentioned new parameters referring to the pausing, resuming and shifting allow to accommodate the higher transmissions to be transmitted by the UE towards the BS or another UE, or to be received from the BS or another UE at the UE. The BS configures the UE with a lower priority transmission to resume transmission once the high priority message has been transmitted, e.g., using an RRC connection reconfiguration signaling accordingly, like an RRC reconfiguration message.

In accordance with other embodiments, the apparatus may be a UE connected to another UE via a sidelink configuration, and the respective UEs are out-of-coverage and operating in mode 4, as is explained with reference to FIG. 3. The base station, therefore, does not have any control over the resource allocation, however, also in such scenarios a highly congested mode 4 resource pool needs to be handled so as to allow low priority transmissions to make way for high priority transmissions. The UE may scan and sense the resource pool for available resources and select them based on the lowest probability of collisions. In the event that the resource pool has not sufficient resources for the high priority transmission, e.g., it is completely occupied, and a UE broadcasts a SCI stating that there is a message of high priority, the SCI will also state the resource which the high priority message uses for the transmission, for example based on a decision of the UE after scanning and sensing the resource pool and choosing a resource having the lowest probability of collision. The inventive approach will be applied, for example, if despite the above-mentioned processes the resource having the lowest probability of collision does not resolve the problem of the congested resource pool. To increase the reliability of the high priority message being received and to reduce the risk of collisions, the UEs that are occupying the selected resource are signaled so as to break or pause their transmission on the resources indicated in the SI for the duration also indicated in the SCI so as to allow the high priority transmission. This ensures that the high priority transmission occurs uninterrupted and upon completion, the UE transmitting a message of lower priority may resume transmission using the initially used resources, for example.

In any of the above-referenced scenarios, the lower priority messages, transmission of which may be paused, may be stored in a buffer of the apparatus or entity which performs the transmission, like a UE. However, there may be situations in which after the completion of the transmission of the high priority message, it is no longer desired or possible to transmit the low priority message, and in such a situation, it will be flushed from the buffer. For example, in case of moving entities, for example vehicles, if the communication arranged between the vehicles has exceeded a maximum communication range, the low priority message will be flushed. For example, if a low priority message transmitting vehicle UE has travelled a certain distance, like 1 km from the receiving vehicle UE any information of low priority concerning, for example, the immediate surroundings of the sending vehicle are of no more interest for the receiving vehicle which is now at a far distance away. Alternatively, if the higher priority message has exceeded a timer, the buffer of the vehicle UE sending the low priority message may also be flushed.

Second Aspect

Figure 8:
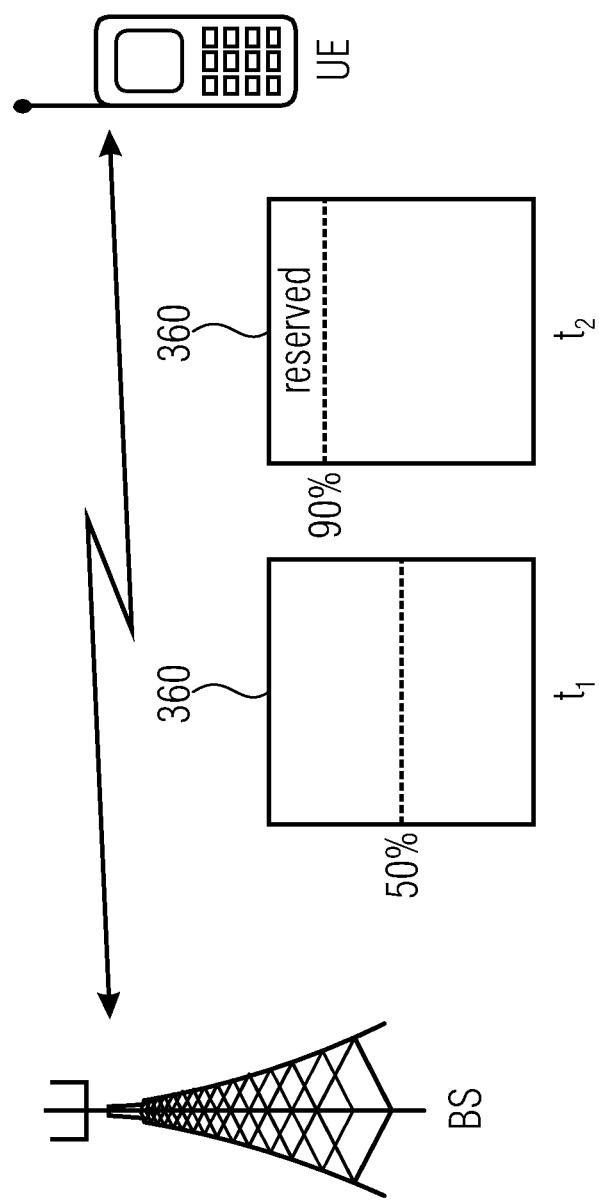
FIG. 8 illustrates schematically an embodiment of the second aspect of the present invention.

In accordance with the second aspect of the present invention, another approach for addressing the problem of enabling transmissions of high priority is to reserve a small set of resources in the resource pool that is then provided only for the high priority transmissions. FIG. 8 illustrates schematically an embodiment of the second aspect of the present invention, and for communication among respective network entities in the radio access network, like between a base station BS and one or more UEs, the pool 360 of resources available for communication between the BS and the UEs is shown at a time $t_1$. It is assumed that at this time only 50% of the resources are used or scheduled, so that any incoming high priority message to be transmitted either from the BS to the UE, from the UE to the BS or among a plurality of UEs may be allocated sufficient resources for the transmission.

At a later time, like time $t_2$ shown in FIG. 8, traffic in the cell covered by the base station BS may have increased and it is determined that 90% of the resources of the pool 360 are now used. In such a scenario, i.e., once the threshold of 90% has been reached, the allocation of resources to messages of low priority is stopped, and the remaining, unused resources are only allocated to high priority messages. When the threshold drops again, the system may return into the situation as indicated at time $t_1$, i.e., any of the resources available may be allocated to any message. In a situation as indicated at time $t_2$, in case a plurality of resource pools of different SCS are available, the low priority message for which no resources will be allocated due to the occupancy level of the first resource pool 360, may have allocated resources from a further resource pool of lower SCS, provided that the requirements of the transmission to be made may be met using the resources from the lower SCS resource pool.

Thus, in accordance with the second aspect, at the time of an increasing occupancy or traffic and a corresponding decreasing number of available resources, the small set of resources now reserved balances the trade-off regarding the amount of data to be transmitted and the available resources to transmit.

It is noted that the above aspect may also be used in a direct communication between two UEs via a sidelink in which the UEs are either in mode 3 or in mode 4.

Aspect 3

As has been mentioned above, the conventional approaches dealing the handling of QoS are not sufficient in many situations, like in vehicular scenarios. When a vertical application, for example a V2X application, is run over a cellular network as described above, a 3GPP EPS or a 5GS network, it is desired to obtain information about the network situation, like the congestion so as to allow the application to adjust itself to the current network situation or capability. The network situation or capability may include the status or the capability of the network at a current time and/or a prediction thereof for the future. When considering, for example, V2X, the need of a feedback from the network to the application has been recognized by the present invention. Examples of functionalities that may be needed for the reliable and efficient performance of a vertical application such as V2X, are one or more of:

a mechanism for the application to monitor (or get feedback of) the RAN status, e.g. congestion, overload, etc.,
a mechanism to share all/some of the information to the UE, in addition to the conventional systems where the monitoring information may be acquired by the Application Server,
a QoS framework for the sidelink, e.g. PC5, and monitoring the status of the sidelink,
a monitoring report or notification to the application upon sensing an event, the application server may react upon receiving such feedback/notification In accordance with the third aspect of the present invention, a mechanism is provided which obtains a status of at least a part of the RAN, and informs the application and/or the receiver running the service provided by the application about the RAN status and/or any changes of the RAN status, wherein a performance of the service, like the QoS, depends on the RAN status. This allows the application at the UE and/or at the application server to accordingly correct its expectations/requirements. Thus, as the network provides feedback to the UE stating that it cannot manage the requirements requested, the UE's application may alter accordingly. For example, information about a congestion and overload is obtained, in other words, the RAN status with regard to the available resources is monitored. On the basis of this information, the quality of service that may be provided via the RAN, for example using a PC5 interface, may be monitored, or, stated more generally, the status of the link between the communicating entities, for example, the status of a sidelink in terms of resources available for transmissions may be monitored. For example, in case of a certain event, the application server or the UE running an application may react responsive to a corresponding feedback. In some application/services the delay that is induced by this process may be critical. For example in case of a platooning service in a V2X application, when the network is able to provide a high QoS to the service, the server may reduce the distance between platoon members to decrease energy consumption. If the QoS degrades suddenly, the distance between platoon members may need to be increased immediately for safety reasons. Another example is the case of automatic driving. In case the coverage of network degrades, the application needs to react promptly, e.g., to decrease the level of automation and transfer the control to manual mode.

For example, the status may be obtained when a current cells status changes, before/during a handover from between cells, macro cells, small cells or macro cell/small cell.

Although conventional approaches may monitor events related to a link between a UE and the network, for example the location of the UE, the UE reachability, a loss of connectivity, a communication failure or a number of UEs which are present in a specific geographical area, the situation or status of the RAN is actually not monitored, for example, a congestion or overload is not monitored by the core network. Thus, also the resources in the RAN or the achievable QoS is not monitored. In accordance with the third aspect of the present invention, this gap is closed.

Figure 9:
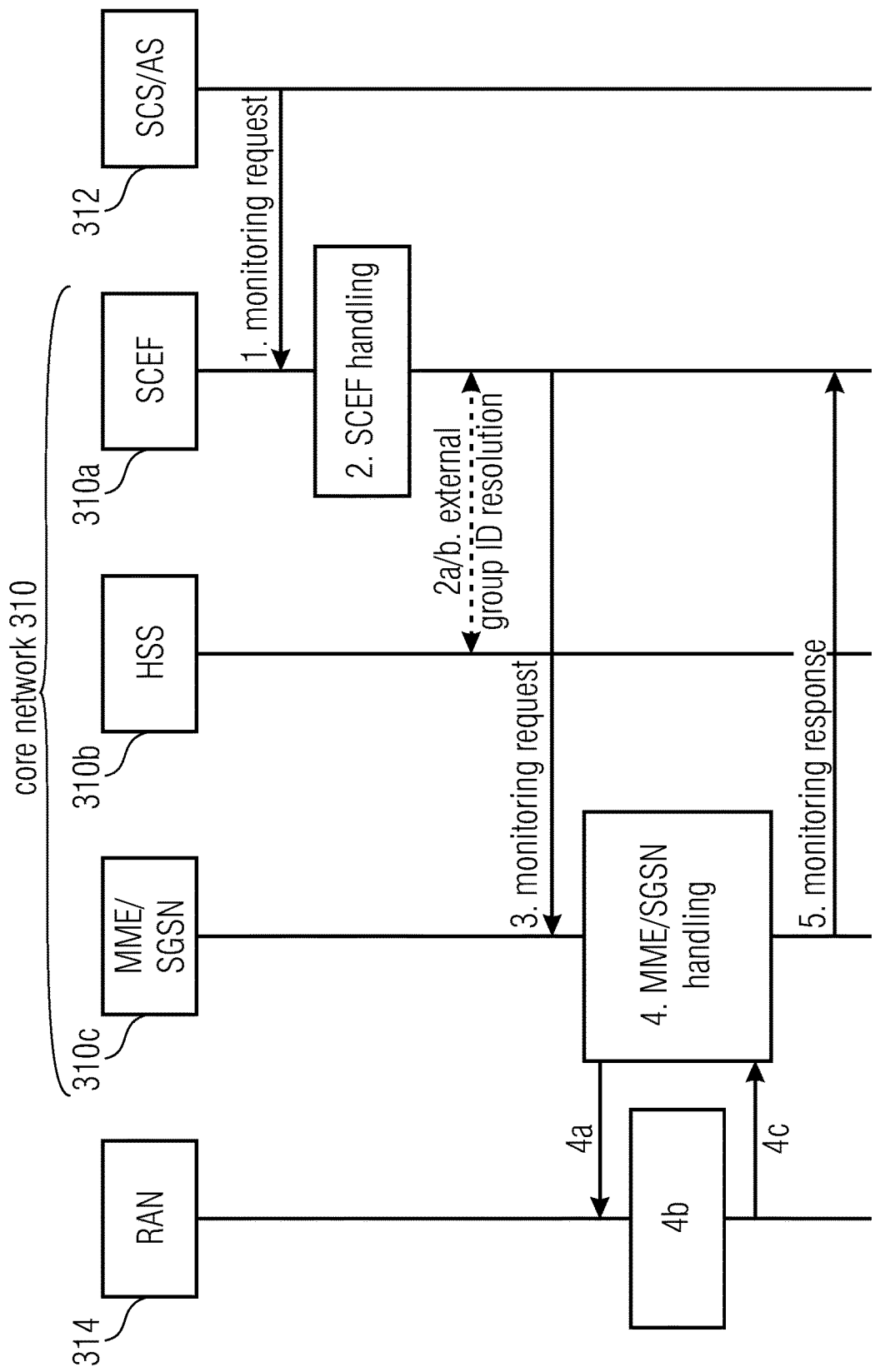
FIG. 9 is a signaling chart of an embodiment for monitoring a RAN situation.

FIG. 9 illustrates an embodiment for monitoring a RAN situation, and illustrates schematically the respective network entities in an EPS system (see also reference [6]) including the application server 312 coupled to the core network 310 which, in turn, is coupled to the radio access network, RAN, 314. The core network includes the service capability exposure function, SCEF 310a, the home subscriber server, HSS, 310b, and the mobility management entity, MME/the serving GPRS support node, SGSN, 312c. The application server 312 may run one or more applications via the cellular network 310, 314 and issue a monitoring request at step 1 which is handled by the SCEF 310a, as is indicated at step 2. The SCEF handling may include a communication with the HSS 310b for an external group ID resolution, as is indicated at steps 2a and 2b. Responsive to the receiving the monitoring request, the SCEF sends a monitoring request at step 3 which is handled by the MME 402e as is indicated at step 4. As step 5 a monitoring response is provided back to the SCEF 310a. So far, the process corresponds to the conventional process described in reference [6].

In accordance with embodiments of the third aspect of the present invention, the conventional procedure is extended by steps 4a, 4b and 4c so that the process of monitoring does not stop at the MME 312c but is extended into the RAN 314. The MME 310c signals at step 4a to the RAN 314 that certain information from the RAN 314 is needed, e.g., information about one or more of the signal traffic load, the resources, the congestion, the interference of some or all UEs of one or more cells of the RAN 314. The RAN 404, at step 4b collects the data, e.g., for creating a RAN status report. At step 4c the RAN status report, which is based on the request at step 4a is provided to the core network 310 or is pushed directly to the relevant network entities, like the SCEF 310a, which provides an interface to the application on the server 312. The status report may also be provided to the UE using a service provided by the application. The application, e.g. application server and/or application client and/or the UE, on the basis of the status information, may determine, e.g., whether a desired QoS is still achievable, for example, whether autonomous driving is still possible or whether, due to a reduced QoS an adaption of the service provided by the application is to be carried out, for example in case of autonomous driving, going back to a manual control.

Figure 10:
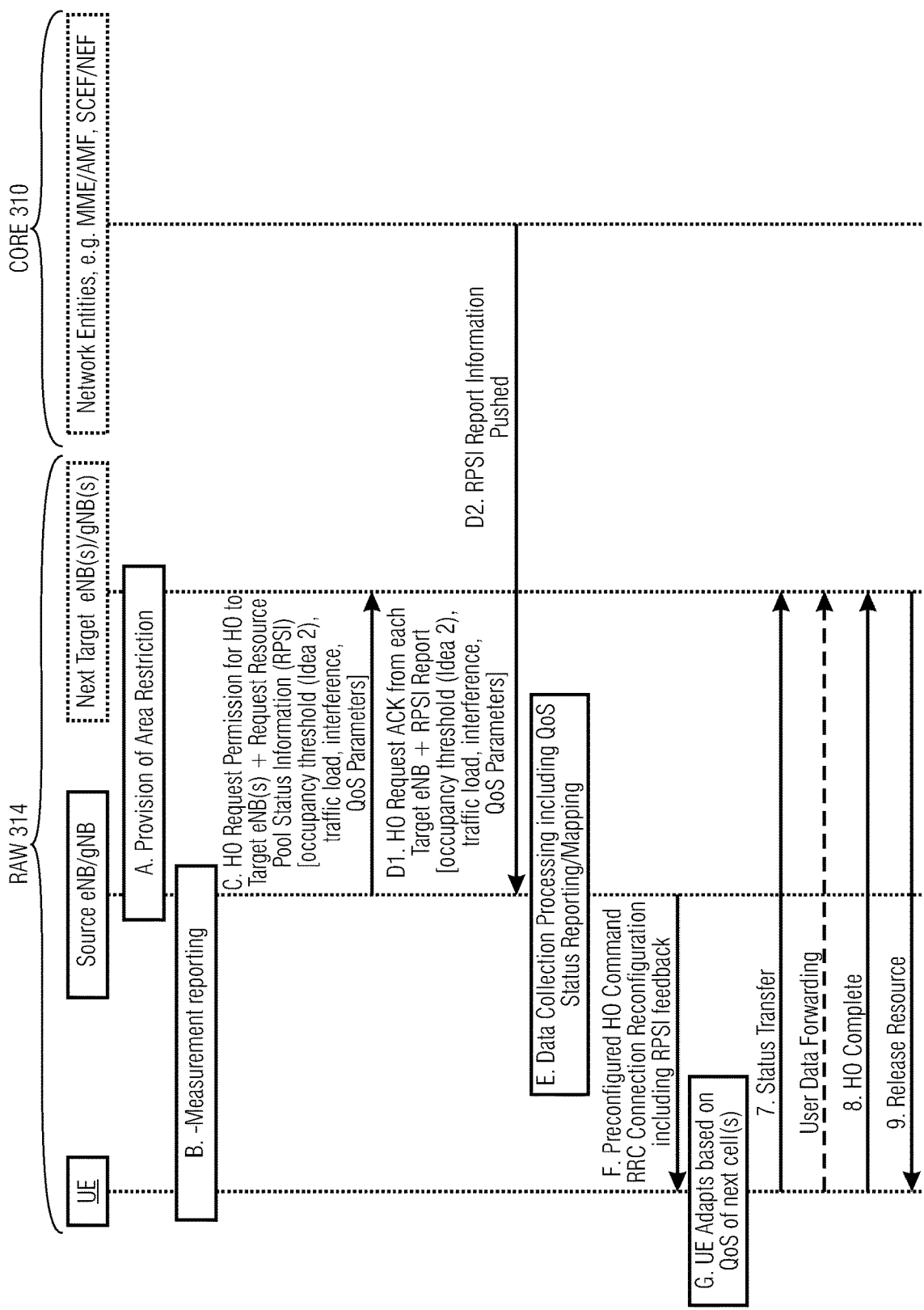
FIG. 10 is a signaling chart for a vehicular UE QoS feedback adaptation in accordance with an embodiment of the present invention.

In the following, the inventive concept of the third aspect for obtaining the RAN status will be described with reference to a handover, HO, procedure. However, the inventive approach is not limited to obtaining a RAN status report in such an event, rather, any other event or a signaling from the application may trigger such a report. FIG. 10 is a signaling chart for a vehicular UE QoS feedback adaptation in accordance with an embodiment of the present invention. More specifically, FIG. 10 illustrates an embodiment modifying a conventional HO procedure in an EPS system, e.g., in case a predictive HO to multiple target cells is enabled, where the source eNB notifies the UE that the next cell(s)/group of cells can/cannot meet a QoS requirements. Naturally, the inventive approach may be applied to any scenario where the QoS changes within the same cell.

Following step A in which the source gNB makes an evaluating for a possible providing area restriction of the UE with the target gNB, and following step B in which the UE reports measurements, steps C to G are performed as follows:

Step C: In addition to the normal admission request for a HO, the source eNB requests the Resource Pool Status Information (RPSI) report from the target eNB(s).
  In accordance with other embodiments, the report is not limited to the concept of resource pools in LTE but other similar concepts in NR, etc.
  The Resource Pool Status Information (RPSI) may include information such as, but not limited to:
    an occupancy threshold information of one or more resource pools
    a traffic load of all uplink/downlink resources
    interference related information
    QoS related information including, e.g., if the QoS can be satisfied, but not limited to:
      Quality parameters, as included in 5QI/QCI parameters, such as a resource type, a priority level, a packet delay budget, a packet error rate, an averaging window of the guaranteed bit rate (GBR), a maximum data burst volume
      ARP
      reflective QoS
      GBR/MBR
      notification control
      a maximum packet loss rate.

FIG. 11 illustrates an embodiment for a HandoverRequest IE extended according to embodiments of the present invention by the elements indicated at 406 and 408.

Step D1: the RPSI report is provided by the target eNB(s)/gNB(s), which may include all the information or a subset of information mentioned above.

Step D2: The RPSI report may be pushed to other network entities as well.

Step E: The source eNB/gNB collects and processes the information (see step 4b in FIG. 9), in order for the UE to easily adapt accordingly. The contents of the RPSI may be mapped in order to determine if a particular QoS needed by the UE can be satisfied or not.

Step F: The source eNB/gNB signals to the UE using, e.g. the V2X-RPSI-feedback IE which can be included in the MobilityControlInfo IE in the RRC Connection Reconfiguration signaling. Multiple options exist on how to signal the UE this feedback depending on the level of abstraction as shown in example signaling:
  FIG. 12 illustrates an embodiment for MobilityControlInfo IE extended according to embodiments of the present invention by the a V2X-RPSI-feedback IE indicated at 410. The V2X-RPSI-feedback IE 410 may include QoS levels, e.g., high, medium, low or a range of values, and any other parameter indicating the possible levels of QoS the target eNB(s)/gNB(s) can satisfy Step G: The application, e.g. V2X application, adapts accordingly based on the RPSI report, e.g., causes braking, acceleration, etc. in case of V2X application or service.

Following steps A-G, the further steps 7-9 for completing the HO are performed.

When considering a 5GS, the table below lists the events that are supported by conventional systems.

TABLE 1

| Event | Description | Which NF detects the event |
|---|---|---|
| QoS change | | AMF |
| RAN congestion, overload, etc. | | AMF |
| Group of eNB event (eNB←AMF←NWDAF←NEF←AF) | | NWDAF |

As this table shows, a situation or status of the resources in the RAN, e.g. RAN congestion and RAN overload cannot be monitored by the application function (AF).

Figure 13:
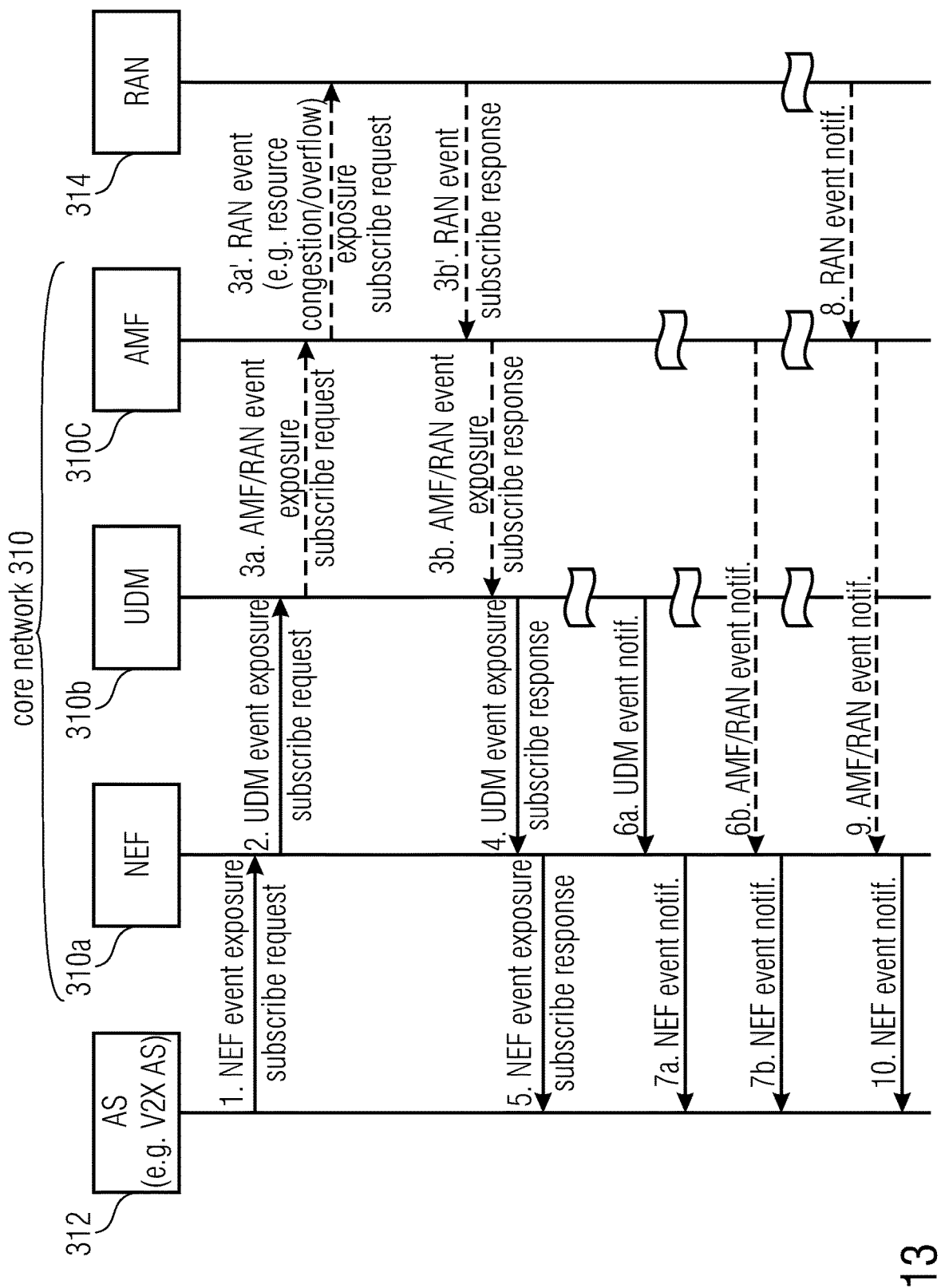
FIG. 13 illustrates an embodiment modifying a conventional monitoring procedure to obtain a RAN status.

In accordance with further embodiments of the third aspect, the AF is enabled to monitor the RAN events, e.g. RAN congestion and/or overflow. FIG. 13 illustrates the monitoring of a RAN situation by the application server (AS) 312 in 5GC. FIG. 13 illustrates an embodiment modifying a conventional monitoring procedure to obtain a RAN status.

The 5GS system of FIG. 13 includes the application server 312 connected to the core network 310 which, in turn, is connected to the radio access network 314. The core network 310 includes the network exposer function, NEF, 310a, the unified data management, UDM, 310b and the core access and mobility management function, AMF, 310c. Conventionally, an application running on the application server, for example a V2X application, subscribes to the core network in step 1 so as to obtain the information about certain events in the network. The NEF 310a, at step 2, issues a subscribe request to the UDM 310b which, in turn, issues a subscribe request to the AMF 310c, as indicated at step 3a.

In accordance with the inventive approach, the request sent as steps 3a is also a subscription to obtain information about RAN events, and other than in the conventional approach, the AMF 310c issues at step 3a' a further request to subscribe to a specific RAN event, like resource congestion or overflow. Responsive to the subscription at step 3a', the RAN 314 provides respective events subscription response or acknowledgement at step 3b' back to the AMF 310c so that the additional feedback subscription response or acknowledgement about the situation at the RAN 314 is provided to the application via the core network 310 in steps 3b, 4 and 5. In accordance with embodiments, the RAN 314 may signals a RAN event to the application server 312 via the AMF and the NEF, as indicated at steps 8, 9 and 10. For example, 8 a report, such as the RPSI event report with reference to the example of FIG. 10 and/or events described in Table 1 may be provided, and the RAN may operate as described above with reference to FIG. 9 (steps 4b-4c) and FIG. 10.

In addition, as in conventional approaches, the application may receive event notification from UDM with or without NEF in the middle via communications at steps 6a and 7a or only a 6a that directly points to the AS. In case of a trusted AS there the NEF between AS and UDM is not needed.

The list of events in the above table is not exhaustive, and further events may be generated and/or collected and/or detected in some other network function (NF), such as the session management function (SMF) and or access and mobility function (AMF). In any case a similar procedure as in FIG. 13 is provided in accordance with the present invention, and in FIG. 13 AMF is then replaced by the involved or responsible NF, e.g. SMF.

Thus, the above-embodiments of the third aspect allow applications and/or application functions, AF, to monitor the communication system for certain RAN events related to the resources, for example a RAN congestion and/or overflow, and on the basis of the RAN congestion, overload and the like, i.e., on the basis of the situation of the resources in the RAN, also events can be determined causing a change of the QoS either in the same group or in a different group or cell.

Figure 14:
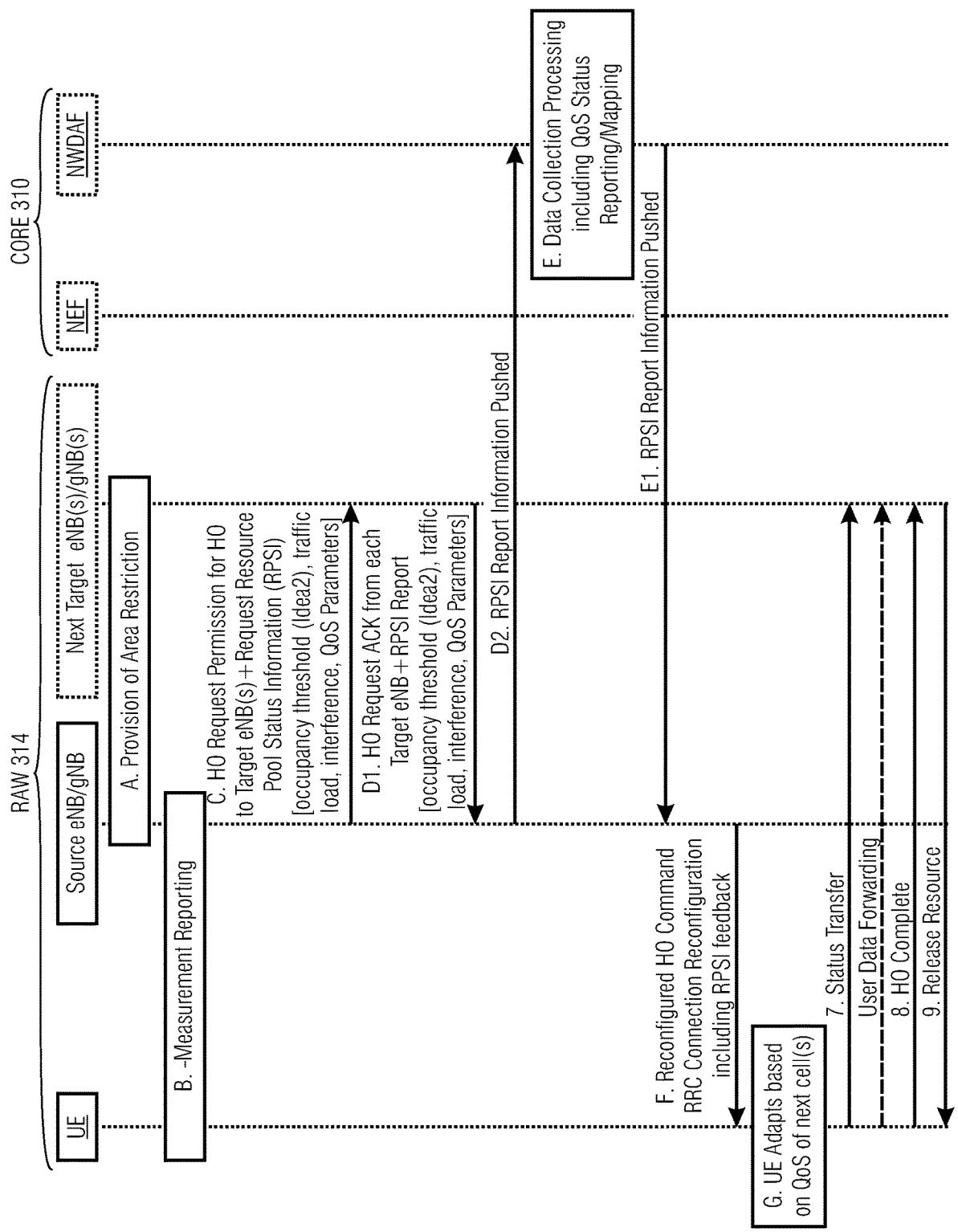
FIG. 14 is a signaling chart of an embodiment for RPSI processing in a 5GS using the NWDAF.

In accordance with yet further embodiments of the third aspect, a network data analysis function may be used for evaluating the information from the RAN so as to determine and/or predict respective events. The NWDAF is responsible for providing network data analytics. NWDAF may for example provide slice congestion events notification and NWDAF operator specific analytics as described in reference [9]. The NWDAF may be employed as illustrated in FIG. 14. FIG. 14 shows a signaling chart for RPSI processing in a 5GS using the NWDAF. Actually, FIG. 14 illustrates how the steps for the HO may be performed in the context of the 5GS. The steps A-G correspond to those described above with reference to FIG. 10, except that step E is performed in the core 310 by the NWDAF.

Thus, according to embodiments of the third aspect, when considering FIG. 10 or FIG. 13, the AF or another part of the system may have information on the UE behavior, e.g., a movement trajectory, and the network may collect additional information about its own situation and about the RAN situation, and provide the result as monitoring event and/or report to the BS, which in turn passes this on to the UE and its residing application and/or application server and/or application client.

When considering FIG. 14, other than in FIG. 10 or FIG. 13, the base station provides the information to the network, where it is used by the NWDAF. The NWDAF also receives the information from the RAN and the network. The NWDAF performs an analysis and may provide the result as monitoring event and/or report to the BS, which in turn passes it on to the UE and its residing application and/or application server and/or application client. For example, the NWDAF may do an analysis over data that are provided by the network and by the RAN with or without any info of a UE behavior being provided by the application. In any case, the analysis result provided by the NWDAF may be some prediction.

Aspect 4:

While aspect 3 described above needed an application to subscribe so as to obtain a notification for QoS changes and/or RAN events, there may be situations in which it is needed to inform the application or application function about changing conditions in the overall network.

In accordance with the fourth aspect of the present invention, the communication system provides notifications, for example push notifications, to the application server and/or the UE. In other words, the event notifications shown in FIG. 9 and FIG. 13 may automatically be triggered so as to inform about critical events or to provide warnings. In other words, in accordance with the fourth aspect of the present invention, a procedure or mechanism is provided so as to provide the core network with the possibility to generate push notifications which may originate from various sources, like the RAN 314, the network 310, the application, etc. Examples of scenarios where push notifications may be implemented include, but are not limited to, one or more of the following scenarios described with reference to FIG. 15.

Figure 15A:
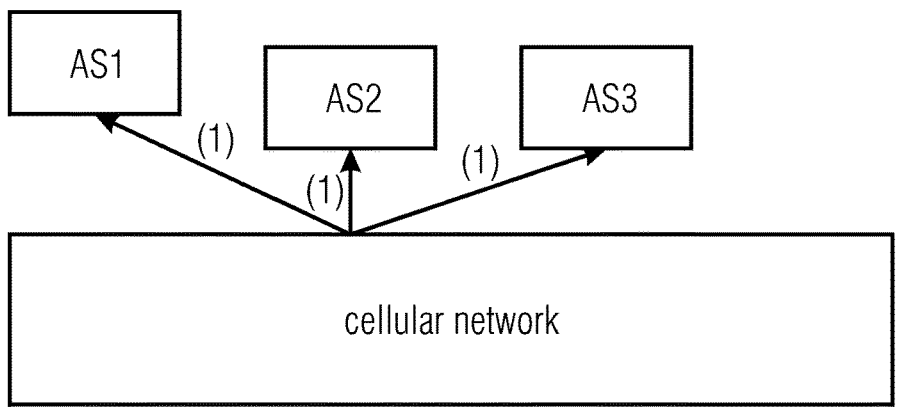
FIG. 15a-c illustrates embodiments of the fourth aspect creating a critical failure message and sending a push notification message to the application, wherein FIG. 15(A) concerns an embodiment in which the network detects critical situation or failure, FIG. 15(b) concerns an embodiment in which an application server detects critical situation or failure, and FIG. 15(c) concerns an embodiment in which a UE detects a critical situation or failure.
Figure 15B:
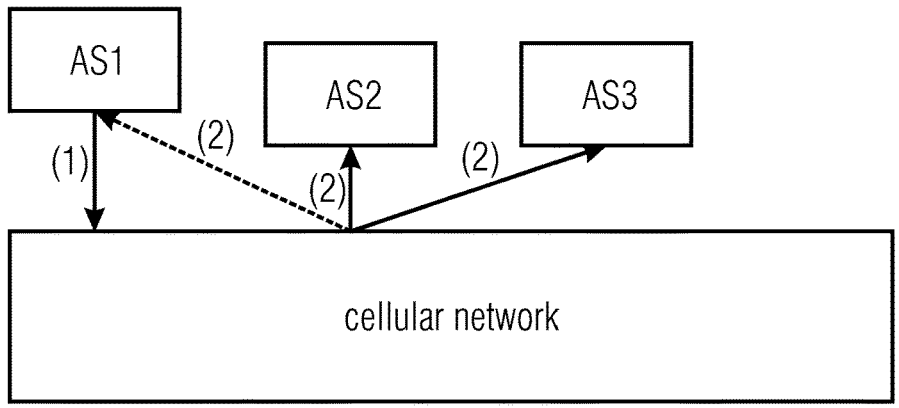
Figure 15C:
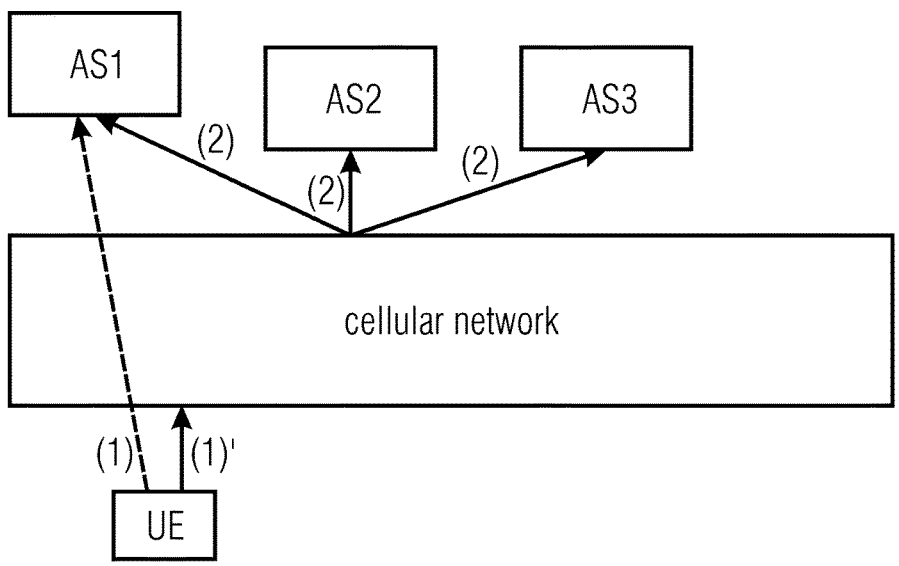

FIG. 15(a) illustrates an embodiment dealing with a critical or severe situation/failure in the RAN, or any other part of the network, for example in case of natural disasters that a part of network is completely down. FIG. 15(a) illustrates the cellular network, including the CN and the RAN, to which three application servers AS1 to AS3 are coupled. The cellular network detects an event that needs to be warned to all other application servers that are active in some geographical area, like As1 to AS3, and sends a push notification (1) to the application servers As1, AS2 and AS3 that are active within the same geographical area. FIG. 15(b) illustrates an embodiment dealing with a severe situation that is sensed by another application server. Like FIG. 15(a) also FIG. 15(b) illustrates the cellular network, including the CN and the RAN, to which the three application servers AS1 to AS3 are coupled. For example application server AS1 detects a dangerous situation in the road, e.g. a severe accident, a fire, etc. and requests (1) the network to send push notification (2) to all other V2X application servers that are active in the involved area. Thus, application server AS1 detects an event that needs to be warned to all other application servers in the area and/or the neighborhood, and the application server AS1 sends a trigger (1) for a push notification to the network. The network sends a push notification (2) to the application servers AS2 and AS3 that are active within the same geographical area as AS1. The push notification (2) may optionally also be den (2) to the application server AS1. FIG. 15(c) illustrates an embodiment dealing with a severe situation that is sensed by a V2X UE. Like FIG. 15(a) also FIG. 15(c) illustrates the cellular network, including the CN and the RAN, to which the three application servers AS1 to AS3 are coupled. In addition a UE is depicted that is connected to the application server AS1 via the cellular network. The UE detects an event that needs to be warned to all other application servers AS1 to AS3 in the area and/or neighborhood. The UE communicates with the application server AS1 as is indicated by (1). In addition, responsive to the detection of the an event the UE sends a trigger (1') for a push notification to the network. The network sends a push notification (2) to the application servers AS1 to AS3 that are active within the same geographical area.

In some of the embodiments described above, reference has been made to respective vehicles being either in the connected mode, also referred to as mode 3 configuration, or vehicles being in the idle mode, also referred to as mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also in such scenarios, scheduling the resources in accordance with the aspects described above is advantageous as it allows for a more efficient scheduling of resources for sidelink communication avoiding resource collisions and the like.

Some embodiments of the present invention have been described above with reference to a communication system in which the transmitter is a base station serving a user equipment, and in which the receiver is the user equipment served by the base station. However, the present invention is not limited to such embodiments and may also be implemented in a communication system in which the transmitter is a user equipment station, and in which the receiver is the base station serving the user equipment. In accordance with other embodiments, the receiver and the transmitter may both be UEs communicating directly with each other, e.g., via a sidelink interface.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 16:
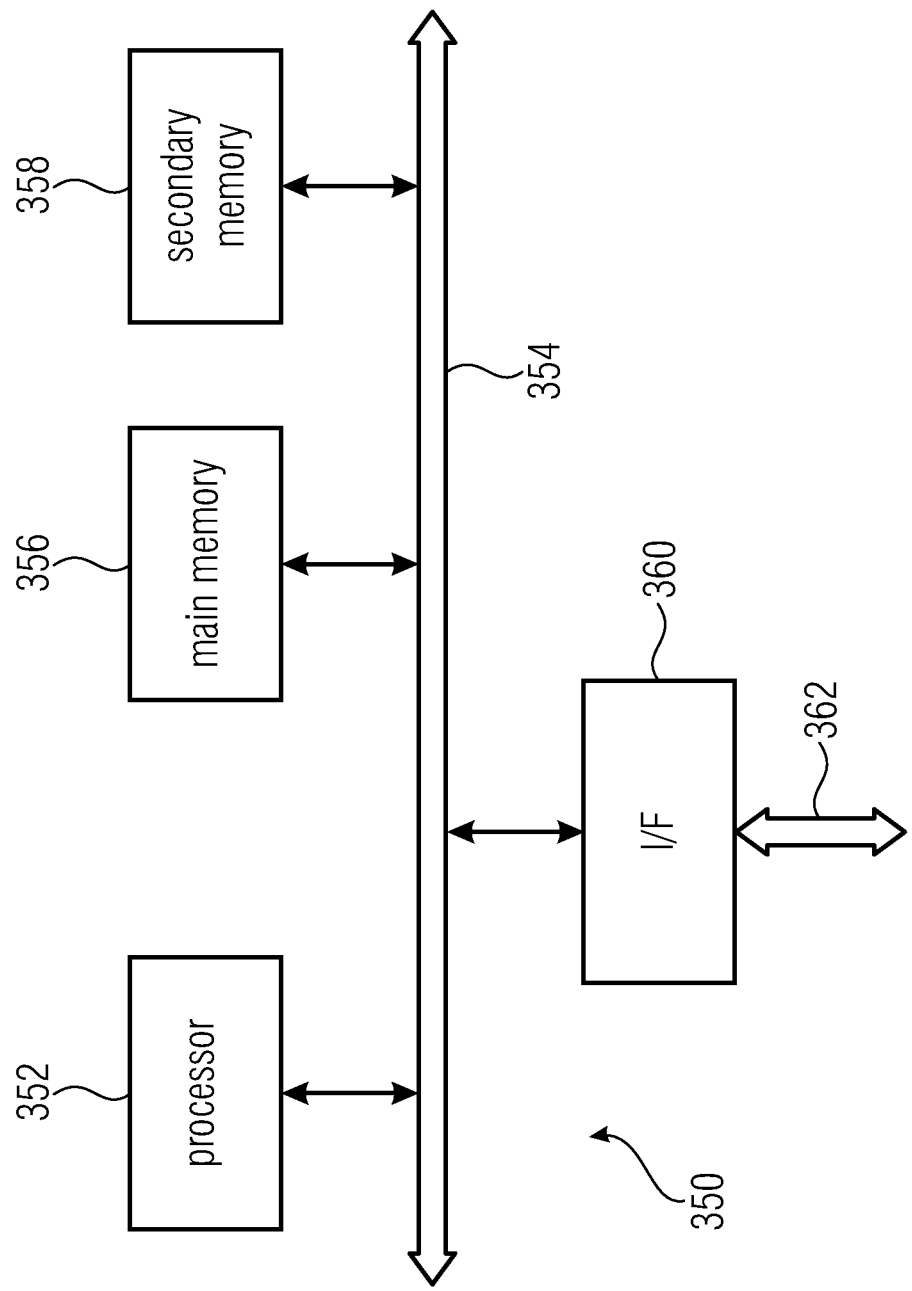
FIG. 16 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 16 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

| V2X | Vehicle-to-Everything |
|---|---|
| 3GPP | Third Generation Partnership Project |
| D2D | Device-to-Device |
| BS | Base Station |
| eNB | Evolved Node B (3G base station) |
| UE | User Equipment |
| SPS | Semi-Persistent Scheduled |
| OS | One Shot |
| PPPP | ProSe per packet Priority |
| PPPR | ProSe per packet Reliability |
| QoS | Quality of Service |
| SCS | Sub Carrier Spacing |
| SCI | Sidelink Control Information |
| BSR | Buffer Status Report |
| NF | Network Function |
| NEF | Network Exposure Function |
| NR | New Radio |
| NWDAF | Network Data Analysis Function |
| OTT | Over-The-Top |
| SIPTO | Selected IP Traffic Offload |
| UDM | Unified Data Management |
| UDR | Unified Data Repository |
| UE | User Equipment (User Terminal) |
| AF | Application Function |
| RAN | Radio Access Network |

REFERENCES

[1] Netmanias, "LTE QoS: SDF and EPS Bearer QoS", https://www.netmanias.com/en/?m=view&id=techdocs&no=10434, September 2011, Last Accessed 25 Jul. 2018.

[2] 3GPP TS 23.501 V15.1.0, System Architecture for the 5G System; Stage 2, March 2018.

[3] Netmanias, "LTE QoS (Part 2) - LTE QoS Parameters (QCI, ARP, GBR, MBR and AMBR)", https://www.netmanias.com/en/post/blog/5933/lte-qos/lte-qos-part-2-lte-qos-parameters-qci-arp-gbr-mbr-and-ambr, October 2013, Last Accessed 25 Jul. 2018.

[4] 3GPP TS 23.682 V15.5.0, Architecture enhancements to facilitate communications with packet data networks and applications (Release 15), June 2018.

[5] 3GPP TS 23.502 V15.2.0, Procedures for the 5G System; Stage 2, (Release 15), June 2018.

[6] 3GPP TS 38.300 V15.1.0, NR and NG-RAN Overall Description; Stage 2 (Release 15), March 2018.

[7] 3GPP TS 38.211 V15.1.0, Physical channels and modulation (Release 15), December 2017.

[8] 3GPP TS 36.331 V15.0.1, Radio Resource Control (RRC); Protocol specification (Release 15), January 2018.

[9] 3GPP TS 29.520 V15.0.0, 5G System; Network Data Analytics Services; Stage 3 (Release 15), January 2018.

What is claimed is:

1. An apparatus comprising:
a processor circuit and a memory circuit,
wherein the memory is arranged to store instructions for the processor circuit,
wherein the processor circuit is arranged to provide a plurality of resources,
wherein the plurality of resources is allocated for transmissions,
wherein the transmissions comprise at least one first transmission and at least one second transmission,
wherein the at least one first transmission has a first priority level,
wherein the at least one second transmission has a second priority level,
wherein the first priority level is higher than the second priority level,
wherein the processor circuit is arranged to receive a signal if there are insufficient resources for an upcoming first transmission,
wherein if there are insufficient resources for the upcoming first transmission, the processor circuit is arranged to:
stop a portion of the at least one second transmission,
release resources allocated to the at least one second transmission, and
allocate the released resources for transmitting or receiving the upcoming first transmission,
wherein stopping the portion of the at least one second transmission comprises pausing the portion of the at least one second transmission for an interval,
wherein the signal comprises a message,
wherein the message indicates a length of the interval, and
wherein the interval is arranged to accommodate for the transmission or the reception of the upcoming first transmission.

2. The device of claim 1,
wherein the message indicates a configuration,
wherein the configuration is used when resuming the portion of the at least one second transmission after the upcoming first transmission has been completed, and
wherein the configuration is at least one of: the same configuration used for an initial portion of the at least one second transmission, and a second configuration.

3. The apparatus of claim 1,
wherein the transmissions comprise at least one third transmission,
wherein the at least one third transmission has a third priority level, wherein the first priority level and the second priority level are higher than the third priority level, wherein the plurality of resources comprises a first plurality of resources and a second plurality of resources, wherein the first plurality of resources comprises resources allocated for the at least one first transmission and the at least one second transmission, and wherein the second plurality of resources comprises resources allocated for the at least one third transmission.

4. The apparatus of claim 3, wherein the first plurality of resources comprises first resources and second resources, wherein the first resources comprise a first plurality of subcarriers with a first subcarrier spacing, wherein the second plurality of resource comprises second resources, wherein the second resources comprise a second plurality of subcarriers with a second subcarrier spacing, wherein the first subcarrier spacing is larger than the second subcarrier spacing, wherein the portion of the second transmission has a requirement to meet a Quality-of-Service, wherein the Quality-of-Service is based on at least one of a latency requirement, a reliability requirement, and a quota requirement, and wherein stopping the portion of the second transmission comprises reallocating the second resources to the portion of the second transmission if at least one of the latency requirement, the reliability requirement, and the quota requirement of the portion of the at least one second transmission can be met by the reallocation.

5. The apparatus of claim 1, wherein the portion of the at least one second transmission is buffered in a buffer of the apparatus, and wherein the apparatus is arranged to flush the portion of the at least one second transmission from the buffer if at least one of:
    a communication range to a target of the portion of the at least one second transmission has exceeded a maximum communication range, and
    the at least one of the first transmission has exceeded a time limit.

6. The apparatus of claim 1, wherein the at least one first transmission comprises a first message, and wherein the first message comprises at least one of: an emergency message, a safety related message, a road hazard warning, and an incoming emergency vehicle message.

7. The apparatus of claim 1, wherein the apparatus comprises a user device, wherein the apparatus is coupled to at least one second user device via a sidelink, and wherein resources from the at least one plurality of resources is allocated for sidelink communication with the at least one second user device by an Evolved Node.

8. The apparatus of claim 1, wherein the apparatus comprises a user device, wherein the apparatus is coupled to at least one second user device via a sidelink, and wherein the processor circuit is arranged to schedule a portion of resources from the at least one plurality of resources for the sidelink.

9. The apparatus of claim 8, wherein the message comprises a sidelink control information message, wherein resources in the sidelink control information message are used for the at least one first transmission, and wherein the processor circuit is arranged to stop the portion of the second transmission based on the sidelink control information message.

10. A transmitter comprising:

a processor circuit and a memory circuit, wherein the memory is arranged to store instructions for the processor circuit, wherein the processor circuit is arranged to provide a plurality of resources, wherein the plurality of resources are allocated for transmissions, wherein the transmissions comprise at least one first transmission and at least one second transmission, wherein the at least one first transmission has a first priority level, wherein the at least one second transmission has a second priority level, wherein the first priority level is higher than the second priority level, wherein, if there are insufficient resources for an upcoming initial transmission of the first transmissions, the processor circuit is arranged to:
    signal to a receiver to stop a portion of the at least one second transmission,
    release resources allocated to the at least one second transmission, and
    reallocate the released resources for at least a portion of the at least one first transmission, and wherein the processor circuit is arranged to determine that there are insufficient resources for the upcoming initial transmission based on at least one of:
    a percentage of used resources from the plurality of resources reach a threshold,
    a percentage of unused resources from the plurality of resources drop below a threshold, and
    there are insufficient unused resources in the plurality of resources for allocation to the portion of the first transmissions.

11. A transmitter comprising:

a processor circuit and a memory circuit, wherein the memory is arranged to store instructions for the processor circuit, wherein the processor circuit is arranged to provide a plurality of resources, wherein the plurality of resources is allocated for transmissions, wherein the transmissions comprise at least one first transmission and at least one second transmission, wherein the at least one first transmission has a first priority level, wherein the at least one second transmission has a second priority level, wherein the first priority level is higher than the second priority level, and wherein the processor circuit is arranged to reserve a portion of non-occupied resources from the plurality of resources for the at least one first transmission, and allocate reserved resources for an initial transmission of the at least one first transmission when an occupancy of the plurality of resources reaches a predefined threshold.

12. The transmitter of claim 11,
wherein the processor circuit is arranged to reserve the amount of non-occupied resources when at least one of: an occupancy and a traffic load threshold has been reached, and
wherein the processor circuit is arranged to allocate reserved resources only for the at least one first transmission, and stop allocating resources for the at least one second transmission when the occupancy or the traffic load threshold is reached.

13. The transmitter of claim 11,
wherein the transmissions comprise at least one a third transmission,
wherein the at least one third transmission has a third priority level,
wherein the first priority level and the second priority level are higher than the third priority level,
wherein the plurality of resources comprises a first plurality of resources and a second plurality of resources,
wherein the first plurality of resources comprises resources allocated for the at least one first transmission and the at least one second transmission, and
wherein the second plurality of resources comprises resources allocated for the at least one third transmission.

14. The transmitter of claim 12,
wherein the at least one second transmission has a requirement to meet a Quality-of-Service,
wherein the Quality-of-Service is based on at least one of:
a latency requirement,
a reliability requirement, and
a quota requirement,
wherein the processor circuit is arranged to allocate resources for the portion of the at least one second transmission in the second plurality of resources, if at least one of the latency requirement, the reliability requirement, and the quota requirement of the portion of the at least one second transmission can be met.

15. The transmitter of claim 13,
wherein the first plurality of resources comprise a first plurality of subcarriers with a first subcarrier spacing,
wherein the second plurality of
resources comprise a second plurality of subcarriers with a second subcarrier spacing, and
wherein the first subcarrier spacing is larger than the second subcarrier spacing.

16. The transmitter of claim 11, wherein the processor circuit is arranged to select the amount of resources reserved for the at least one first transmission based on at least one of: a real-time load, and an anticipated load of the plurality of resources.

17. The transmitter of claim 11,
wherein the transmitter comprises a first user device,
wherein the transmitter is coupled to at least one second user device via a sidelink, and
wherein the processor circuit schedules a portion of the plurality of resources for the sidelink communication with the at least one second user device.

18. The transmitter of claim 11,
wherein the processor circuit comprises a user device,
wherein the transmitter is coupled to at least one second user device via a sidelink, and
wherein the transmitter is arranged to schedule a portion of the resources from the plurality of resources for the sidelink.

* * * * *